US008618204B2

(12) United States Patent
Campbell et al.

(10) Patent No.: US 8,618,204 B2
(45) Date of Patent: Dec. 31, 2013

(54) TWO-PART EPOXY-BASED STRUCTURAL ADHESIVES

(75) Inventors: Christopher J. Campbell, Burnsville, MN (US); Alphonsus V. Pocius, Maplewood, MN (US); Liya Gorodisher, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 38 days.

(21) Appl. No.: 13/055,198

(22) PCT Filed: Jul. 22, 2009

(86) PCT No.: PCT/US2009/051346
§ 371 (c)(1),
(2), (4) Date: Jan. 21, 2011

(87) PCT Pub. No.: WO2010/011710
PCT Pub. Date: Jan. 28, 2010

(65) Prior Publication Data
US 2011/0126980 A1    Jun. 2, 2011

Related U.S. Application Data

(60) Provisional application No. 61/082,867, filed on Jul. 23, 2008.

(51) Int. Cl.
*C08K 7/08* (2006.01)
*C08K 7/10* (2006.01)
*C08G 59/18* (2006.01)

(52) U.S. Cl.
USPC ........... 524/450; 106/461; 106/464; 106/467; 524/789; 524/791; 528/87; 528/92

(58) Field of Classification Search
USPC .......... 106/461, 464, 467; 524/450, 789, 791; 528/87, 92
See application file for complete search history.

(56) References Cited

U.S. PATENT DOCUMENTS

| 4,119,615 A | 10/1978 | Schulze |
| 4,263,366 A | 4/1981 | Lorenz et al. |
| 4,332,713 A * | 6/1982 | Lehmann ..................... 156/328 |

(Continued)

FOREIGN PATENT DOCUMENTS

| EP | 230666 | 8/1987 |
| EP | 301720 | 2/1989 |

(Continued)

OTHER PUBLICATIONS

Lapinus, product data sheet for CoatForce CF10. Jul. 2008. Retrieved from www.lapinusfibres.com.*

(Continued)

*Primary Examiner* — Richard A Huhn
(74) *Attorney, Agent, or Firm* — Dena M. Ehrich

(57) ABSTRACT

A two-part epoxy-based structural adhesive composition comprising a curable epoxy resin, an amine curing agent, a toughening agent, and an oil-displacing agent. The structural adhesive may optionally include reactive liquid modifiers, fillers, secondary curatives, reactive diluents, surfactants, metal salts, pigments and combinations thereof. The structural adhesive may be used to form bonded joints between adherends having clean surfaces, as well as those having surfaces contaminated with hydrocarbon-containing materials, such as oils, processing aids and lubricating agents.

19 Claims, 1 Drawing Sheet

(56) References Cited

U.S. PATENT DOCUMENTS

| | | |
|---|---|---|
| 4,401,776 A | 8/1983 | Munk |
| 4,476,285 A | 10/1984 | Crabtree et al. |
| 4,778,851 A | 10/1988 | Henton et al. |
| 4,906,722 A | 3/1990 | Eldin et al. |
| 5,026,794 A | 6/1991 | Ho et al. |
| 5,290,624 A | 3/1994 | Bujard |
| 5,494,977 A | 2/1996 | Harano et al. |
| 5,629,380 A | 5/1997 | Baldwin et al. |
| 5,686,509 A | 11/1997 | Nakayama et al. |
| 6,180,693 B1 | 1/2001 | Tang et al. |
| 6,465,558 B2 | 10/2002 | Scheibelhoffer et al. |
| 6,554,936 B1 | 4/2003 | Metcalf et al. |
| 6,555,227 B2 | 4/2003 | Sprenger et al. |
| 6,632,872 B1 | 10/2003 | Pellerite et al. |
| 6,664,318 B1 | 12/2003 | Bymark et al. |
| 2001/0056137 A1* | 12/2001 | Buter et al. ............... 523/414 |
| 2003/0157320 A1* | 8/2003 | Rieder et al. ............... 428/364 |
| 2004/0043146 A1* | 3/2004 | Pellerite et al. ............ 427/207.1 |
| 2010/0294427 A1* | 11/2010 | Forster et al. ............ 156/307.3 |
| 2011/0039108 A1 | 2/2011 | Goeb et al. |
| 2011/0120646 A1 | 5/2011 | Gorodisher et al. |
| 2011/0126980 A1 | 6/2011 | Campbell et al. |
| 2011/0130518 A1 | 6/2011 | Gorodisher et al. |

FOREIGN PATENT DOCUMENTS

| | | |
|---|---|---|
| EP | 336762 | 10/1989 |
| EP | 449776 | 10/1991 |
| EP | 483974 | 5/1992 |
| EP | 847420 | 2/2000 |
| EP | 847410 | 11/2001 |
| EP | 1280842 | 11/2005 |
| EP | 1271043 | 9/2006 |
| GB | 2444364 | 6/2008 |
| JP | 6169879 | 4/1986 |
| JP | 050156225 | 6/1993 |
| JP | 11061072 | 3/1999 |
| JP | 2005272813 | 10/2005 |
| WO | WO 95/00597 | 1/1995 |
| WO | WO 99/67312 | 12/1999 |
| WO | WO 00/22024 | 4/2000 |
| WO | WO 02/24792 | 3/2002 |
| WO | WO 02/062909 | 8/2002 |
| WO | WO 02/102909 | 12/2002 |
| WO | WO 03/078163 | 9/2003 |
| WO | WO 03/097756 | 11/2003 |
| WO | WO 2005/048866 | 6/2005 |
| WO | WO 2006/093949 | 9/2006 |
| WO | WO 2006/128722 | 12/2006 |
| WO | WO 2007/025007 | 3/2007 |
| WO | WO 2008/016889 | 2/2008 |
| WO | WO 2008/089410 | 7/2008 |
| WO | WO 2008/147614 | 12/2008 |
| WO | WO 2009/126862 | 10/2009 |

OTHER PUBLICATIONS

Aikins, "Radiation-induced cationic polymerization of terpene epoxides", American Chemical Society, Division of Polymer Chemistry, Polymer Preprints, vol. 24, No. 260, (1984).

Andreopoulos, "Treated Polyethylene Fibres as Reinforcement for Epoxy Resins", Journal of Materials Science, vol. 1993, pp. 5002-5006.

ASTM C813-90 e1, "Standard Test Method for Hydrophobic Contamination on Glass by Contact Angle Measurement," 3 pages. 1994.

ASTM D 1002-05.

ASTM D 1876.

ASTM D 281.

ASTM D 6386-99.

"Azo Compounds", Sigma-Aldrich, [online], [retrieved from the internet on Oct. 5, 2011], http://www.sigmaaldrich.com/materials-science/material-science-products. html?TablePage=20396479http://www.sigmaaldrich.com/materials-science/material-science-products. html?TablePage=20396479, 1 page.

"Coating Additives: Prevention of Crack Formation Using CoatForce® in Building Paints", Lapinus Fibres by, Technical Literature (2008).

Cooper, "Adhesive Properties of Terpene Cleaning Solvent Residues", Annual Technical Conference—ANTEC, Conference Proceedings, vol. 6, No. 233, (2005).

Clemens, Chem Rev., vol. 86, pp. 241 (1986).

Fakuda, "Synthesis of Macrocyclic Amides and Their Intermediate 2:1 and 3:2 Reaction Compounds from Diethyl Oxalate and Ethereal Oxygen-Containing Diamines", Bulletin of the Chemical Society of Japan, Chemical Society of Japan, vol. 69, No. 5, Jan. 1, 1996, pp. 1397-1401, (XP009138015).

Hansen, "Surface Tension by Pendant Drop," Journal of Colloid and Interface Science, vol. 141, No. 1, (Jan. 1991) p. 1-9.

Heilmann, "Acrylic-Functional Aminocarboxylic Acids and Derivatives as Components of Pressure-Sensitive Adhesives", J. Appl. Polym. Sci., vol. 24, 1979, pp. 1551-??.

Heilmann, "Chemistry of Alkenyl Azlactones IV. Preparation and Properties of Telechelic Acrylamides Derived from Amine-Terminated Oligomers", J. Polymer Sci.: Polymer Chem. Ed., vol. 22, 1984, pp. 3149-3160.

Hong, "Assimilation of Oil from Metal Surfaces by Epoxy Adhesives: XPS and ATR Analyses," Journal of Applied Polymer Science, vol. 55, 1995, pp. 437-449.

Janssen, "Bridging Gaps: New Mineral Fibres Offer a Variety of Coatings Performance Improvements", European Coatings Journal 1-2, pp. 30-33 (2006).

Liu, "Alkoxysilane Functionalized Polycaprolactone/polysiloxane Modififed Epoxy Resin Through Sol-gel Process", European Polymer Journal, vol. 44, No. 3, Dec. 23, 2007, pp. 940-951, (XP022519383).

Mark, Encyclopedia of Polymer Science and Engineering, 3rd Ed., Wiley-Interscience, New York, 2004, vol. 11, pp. 359.

Metal Bonding Structural Adhesive Performance Requirements, GM Worldwide Engineering Standards, Material Specification: Adhesives, Ballot Mar. 26, 2007, GMW15200.

"Organic Peroxides", Sigma Aldrich, [online], [retrieved from the internet on Oct. 5, 2011], http://www.sigmaaldrich.com/materials-science/material-science-products.html?TablePage=20396497, 2 pages.

Palamidessi, "Derivati Della Pirazina, Nota IX, Sulla 2,3-dicloropirazina", Farmaco, Societa Chimica Italiana, vol. 21, Jan. 1, 1966, pp. 799-804, (XP009138014).

Pocius, Adhesion and Adhesives Technology, $2^{nd}$ Ed., Hanser: Cincinnati, OH, pp. 186 and 201, (2002).

Polymer Chemistry, The Basic Concepts, Paul C. Hiemenz, Marcel Dekker, 1984.

Samui, "Electroatractive Polymer Gels Based on Epoxy Resin", Smart Materials and Structures, vol. 16, 2007, pp. 237-242, (XP002568425).

Sigma Aldrich Catalog, (XP002568433).

"Solvent Cleaning", Surface Preparation Specifications and Practices, Edition SSPC 05-03, pp. 52-53 (2005).

Taylor, "The Synthesis of Vinyl Peptide Monomers", J. Polym. Sci. Polym. Lett. Ed., vol. 7, 1969, pp. 597-603.

van Krevelen, Properties of Polymers: Their Correlations with Chemical Structure: Their Numerical Estimation and Prediction from Additive Group Contributions, 4th Ed., 1990, Elsevier: Amsterdam, The Netherlands, pp. 220-225.

Wicks, "Blocked Isocyanates III: Part A, Mechanisms and Chemistry", Progress in Organic Coatings, vol. 36, 1999, pp. 148-172, (XP002598687).

Witzeman, J. Org. Chem., 56, 1713 (1991).

International Search Report, PCT/US2009/051346, 4 pages.

* cited by examiner

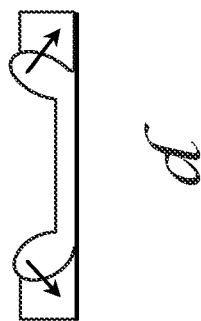
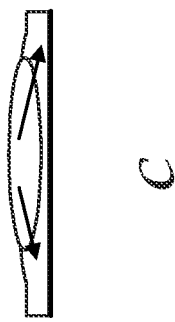
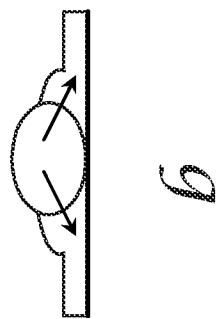
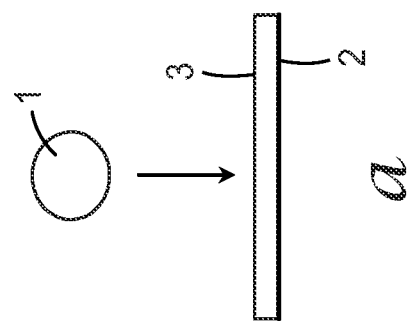

TWO-PART EPOXY-BASED STRUCTURAL ADHESIVES

CROSS REFERENCE TO RELATED APPLICATIONS

This application is a national stage filing under 35 U.S.C. 371 of PCT/US2009/051346, filed Jul. 22, 2009, which claims priority to Provisional Application No. 61/082,867, filed Jul. 23, 2008, the disclosure of which is incorporated by reference in its/their entirety herein.

FIELD OF THE INVENTION

The present invention relates to two-part epoxy-based structural adhesives, particularly epoxy-based adhesives that when cured exhibit properties useful in structural assembly. The present invention also relates to methods of making and using the two-part epoxy-based structural adhesives.

BACKGROUND

Structural adhesives are typically thermosetting resin compositions that may be used to replace or augment conventional joining techniques such as screws, bolts, nails, staples, rivets and metal fusion processes (e.g., welding, brazing and soldering). Structural adhesives are used in a variety of applications that include general-use industrial applications, as well as high-performance applications in the automotive and aerospace industries. To be suitable as structural adhesives, the adhesives should exhibit high mechanical strength and high impact resistance.

Since adhesion is a surface physico-chemical phenomenon, it follows that the physical properties of an adhesive bond depend strongly on the interaction of the structural adhesive with the surface of adherends used to form an adhesive bond. Under ideal conditions, the structural adhesive is applied to the clean surface of an adherend. However, due to cost and processing limitations, the surface of an adherend (e.g., an automotive part) is often contaminated with hydrocarbon-containing materials which, if left untreated, can lead to undesirable bond failure at the adhesive/adherend interface. Contaminants may include mill and corrosion protection oil on steel and aluminum, fingerprints, and other grime and soil found in manufacturing processes and warehousing.

Removing hydrocarbon-containing material from surfaces of adherends can be difficult. Mechanical processes such as dry wiping and/or the use of pressurized air tend to leave a thin layer of the hydrocarbon-containing material on the metal surface. Liquid cleaning compositions can be effective but may be less desirable from a processing point of view because the cleaning liquid must be collected and recycled or discarded. In addition, a drying period is usually required after the cleaning step. Therefore, a need exists within the industry for structural adhesives that form strong adhesive bonds on clean surfaces, as well as surfaces contaminated with hydrocarbon-containing material.

SUMMARY

In one embodiment, the invention provides a two-part adhesive composition having a first part and a second part, the adhesive comprising a curable epoxy resin in the first part, an amine curing agent in the second part, a toughening agent in the first part, the second part or combination thereof; and an oil displacing agent in the first part, the second part or combination thereof, wherein the first part and second part are combined to form the two-part adhesive composition.

In another embodiment, the invention provides a method of making a composite article, the method comprising applying the two-part adhesive to a surface, and curing the two-part adhesive in contact with the surface to form a composite article.

In a further embodiment, the invention provides a method of forming a bonded joint between members, the method comprising applying the two-part adhesive to a surface of at least one of two or more members, joining the members so that the two-part adhesive is sandwiched between the two or more members, and curing the two-part adhesive to form a bonded joint between the two or more members.

Other features and aspects of the invention will become apparent by consideration of the detailed description and accompanying drawing.

BRIEF DESCRIPTION OF THE DRAWINGS

FIG. 1 illustrates film rupture of a potential oil-displacing compound during the drop test described in Example 1.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Any numerical range recited herein includes all values from the lower value to the upper value. For example, if a concentration range is stated as 1% to 50%, it is intended that values such as 2% to 40%, 10% to 30%, or 1% to 3%, etc., are expressly enumerated. These are only examples of what is specifically intended, and all possible combinations of numerical values between and including the lowest value and the highest value enumerated are to be considered to be expressly stated in this application.

The present invention relates to two-part epoxy-based structural adhesives that may be applied to clean substrates, as well as substrates contaminated with hydrocarbon-containing materials. The two-part epoxy-based structural adhesives comprise at least one curable epoxy resin, at least one amine curing agent, at least one toughening agent, and at least one oil-displacing agent. The structural adhesives may include other ingredients such as fillers (particularly inorganic mineral fibers, organic fibers and/or fibers having aspherical and/or platelet structures), secondary curatives, reactive liquid modifiers, reactive diluents, surfactants, metal salts, pigments, and combinations thereof. The structural adhesives may be used to replace or augment conventional joining means such as welds or mechanical fasteners in bonding parts together.

Curable Epoxy Resins

Structural adhesives of the present invention comprise at least one curable epoxy resin. The epoxy resins may be monomeric, dimeric, oligomeric or polymeric epoxy materials containing at least one epoxy functional group per molecule.

Such resins may be aromatic or aliphatic, cyclic or acyclic, monofunctional or polyfunctional. The backbone of the resin may be of any type, and substituent groups thereon can be any group not having a nucleophilic group or electrophilic group (such as an active hydrogen atom) which is reactive with an oxirane ring. Exemplary substituent groups include halogens, ester groups, ethers, sulfonate groups, siloxane groups, nitro groups, amide groups, nitrile groups, and phosphate groups.

The molecular weight of the epoxy resins may range from about 100 g/mole for monomeric or oligomeric resins to 50,000 g/mole or more for polymeric resins. Suitable epoxy resins are typically a liquid at room temperature. However, soluble solid epoxy resins may also be used. Epoxy resins may be used alone or in combination. In some embodiments, the epoxy component comprises a mixture of two or more epoxy resins in order to modify and adapt the mechanical properties of the cross-linked structural adhesive with respect to specific requirements.

Types of epoxy resins that can be used include, for example, the reaction product of bisphenol A and epichlorohydrin, the reaction product of phenol and formaldehyde (novolac resin) and epichlorohydrin, peracid epoxies, glycidyl esters, glycidyl ethers, the reaction product of epichlorohydrin and p-amino phenol, the reaction product of epichlorohydrin and glyoxal tetraphenol and the like.

Epoxides that are particularly useful in the present invention are of the glycidyl ether type. Suitable glycidyl ether epoxides may include those in general formula (I):

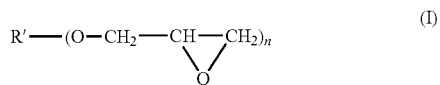

wherein R' is an n valent organic residue that may include, for example, an alkyl group, an alkyl ether group, or an aryl group; and n is at least 1. In some embodiments R' is a poly(alkylene oxide). In some embodiments, n ranges from 1 to 4.

Suitable glycidyl ether epoxides of formula (I) include glycidyl ethers of bisphenol A and F, aliphatic diols or cycloaliphatic diols. In some embodiments the glycidyl ether epoxides of formula (I) have a molecular weight in the range of from about 170 g/mol to about 10,000 g/mol. In other embodiments, the glycidyl ether epoxides of formula (I) have a molecular weight in the range of from about 200 g/mol to about 3,000 g/mol.

Useful glycidyl ether epoxides of formula (I) include linear polymeric epoxides having terminal epoxy groups (e.g., a diglycidyl ether of polyoxyalkylene glycol) and aromatic glycidyl ethers (e.g., those prepared by reacting a dihydric phenol with an excess of epichlorohydrin). Examples of useful dihydric phenols include resorcinol, catechol, hydroquinone, and the polynuclear phenols including p,p'-dihydroxydibenzyl, p,p'-dihydroxyphenylsulfone, p,p'-dihydroxybenzophenone, 2,2'-dihydroxyphenyl sulfone, p,p'-dihydroxybenzophenone, 2,2-dihydroxy-1,1-dinaphrylmethane, and the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylenphenylmethane, dihydroxydiphenylbutylmethylmethane, dihydroxydiphenyltolylethane, dihydroxydiphenyltolylmethylmethane, dihydroxydiphenyldicyclohexylmethane, and dihydroxydiphenylcyclohexane.

Suitable commercially available aromatic and aliphatic epoxides include diglycidylether of bisphenol A (e.g., available under the tradename EPON 828, EPON 872, EPON 1001, EPON 1310 and EPONEX 1510 from Hexion Specialty Chemicals GmbH in Rosbach, Germany), DER-331, DER-332, and DER-334 (available from Dow Chemical Co. in Midland, Mich., USA); diglycidyl ether of bisphenol F (e.g., EPICLON 830 available from Dainippon Ink and Chemicals, Inc.); $PEG_{1000}DGE$ (available from Polysciences, Inc. in Warrington, Pa., USA); silicone resins containing diglycidyl epoxy functionality; flame retardant epoxy resins (e.g., DER 580, a brominated bisphenol type epoxy resin available from Dow Chemical Co. in Midland, Mich., USA); 1,4-dimethanol cyclohexyl diglycidyl ether; and 1,4-butanediol diglycidyl ether. Other epoxy resins based on bisphenols are commercially available under the tradenames D.E.N., EPALLOY and EPILOX.

In some embodiments of the present invention, the structural adhesives comprise at least about 20% by weight curable epoxy resin, in some embodiments at least about 40% by weight curable epoxy resin, and in some embodiments at least about 50% by weight curable epoxy resin. In some embodiments of the present invention, the structural adhesives comprise less than about 90% by weight curable epoxy resin, in some embodiments less than about 80% by weight curable epoxy resin, and in some embodiments less than about 70% by weight curable epoxy resin. Percent weight is based upon the total weight of the two-part structural adhesive (i.e., the combined weights of Parts 1 and 2).

In some embodiments of the present invention, the structural adhesives comprise from about 20% to about 90% by weight curable epoxy resin. In other embodiments, the structural adhesives comprise from about 40% to about 70% by weight curable epoxy resin. In yet other embodiments, the structural adhesives comprise from about 50% to about 70% by weight curable epoxy resin.

Amine Curing Agents

Structural adhesives of the present invention also comprise at least one curing agent capable of cross-linking the curable epoxy resin. Typically these agents are primary or secondary amines. The amines may be aliphatic, cycloaliphatic, aromatic, or aromatic structures having one or more amino moieties.

Suitable amine curing agents include those amines having the general formula (II):

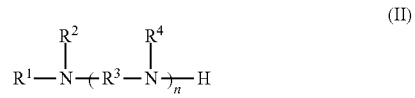

wherein $R^1$, $R^2$, $R^3$ and $R^4$ are each independently hydrogen or a hydrocarbon containing from about 1 to 15 carbon atoms, wherein the hydrocarbons include polyethers; and the value for n ranges from about 1 to 10. In some embodiments, the curing agent is a primary amine. In the same, or other embodiments, $R^3$ is a polyetheralkyl.

Exemplary amine curing agents include ethylene diamine, diethylene diamine, diethylene triamine, triethylene tetramine, propylene diamine, tetraethylene pentamine, hexaethylene heptamine, hexamethylene diamine, 2-methyl-1,5-pentamethylene-diamine, 4,7,10-trioxatridecan-1,13-diamine, aminoethylpiperazine and the like.

In some embodiments, the amine curing agent is a polyether amine having one or more amine moieties, including those polyether amines that can be derived from polypropylene oxide or polyethylene oxide. Commercially available polyether amines include the JEFFAMINE™ series of polyether polyamines (available from Huntsman Corporation in The Woodlands, Tex., USA) and 4,7,10-trioxatridecane-1,13-diamine (TTD) (available from TCI America in Portland, Oreg., USA).

In some embodiments of the present invention, the structural adhesives comprise at least about 3% by weight amine curing agent, in some embodiments at least about 5% by weight amine curing agent, and in some embodiments at least about 10% by weight amine curing agent. In some embodiments of the present invention, the structural adhesives comprise less than about 30% by weight amine curing agent, in some embodiments less than about 20% by weight amine curing agent, and in some embodiments less than about 15% by weight amine curing agent.

In some embodiments of the present invention, the structural adhesives comprise from about 3% to about 30% by weight amine curing agent. In other embodiments, the structural adhesives comprise from about 5% to about 15% by weight amine curing agent.

The molar ratio of epoxide moieties to primary or secondary amine hydrogens can be adjusted to achieve optimum performance through routine experimentation. Structural adhesives of the present invention may have a molar ratio of epoxy moieties on the curable epoxy resin to amine hydrogens on the amine curing agent ranging from about 0.5:1 to about 3:1. In some embodiments, the molar ratio is about 2:1. In other embodiments, the molar ratio is about 1:1.

Secondary Curatives

In some embodiments, the structural adhesives of the present invention may optionally comprise a secondary curative. Secondary curatives according to the invention include imidazoles, imidazole-salts, imidazolines or aromatic tertiary amines including those having the structure of formula (III):

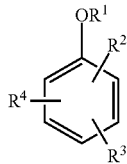

(III)

wherein
$R^1$ is H or alkyl (e.g., methyl or ethyl);
$R^2$ is $CHNR^5R^6$;
$R^3$ and $R^4$ may be, independently from each other, present or absent and when present $R^3$ and $R^4$ are $CHNR^5R^6$; and
$R^5$ and $R^6$ are, independent from each other, alkyl (e.g., $CH_3$ or $CH_2CH_3$);

An exemplary secondary curative is tris-2,4,6-(dimethylaminomethyl)phenol (available as ANCAMINE K54 from Air Products Chemicals in Europe B.V).

Oil Displacing Agents

One or more oil displacing agents are added to the structural adhesives of the present invention to promote adhesion between the structural adhesive and the surface of adherends contaminated with hydrocarbon-containing material. Hydrocarbon-containing material refers to a variety of surface contaminants that may result from the processing, handling, and storage of adherends. Examples of hydrocarbon-containing materials include mineral oils, fats, dry lubes, deep drawing oils, corrosion protection agents, lubricating agents and waxes. However, a surface may comprise other contaminating agents in addition to the hydrocarbon-containing material. Without wishing to be bound by theory, it is believed that the oil displacing agent within the adhesive facilitates transfer of hydrocarbon-containing material away from the surface of the contaminated adherend and into the bulk of the adhesive for an improved adhesive bond. Sufficient bond strengths using adhesives comprising oil-displacing agents are obtained without the need for a heat cure step.

Oil-displacing agents of the present invention are generally liquid compounds that are capable of disrupting or displacing hydrocarbon-containing materials at the surface of an adherend while remaining miscible with the bulk adhesive during application and curing. Such compounds may exhibit surface tensions lower than that of the hydrocarbon-containing material and/or solubility parameters similar to that of the hydrocarbon-containing material.

In some embodiments of the present invention, the oil-displacing agent has a surface tension less than about 35 mN/m. In other embodiments, the oil-displacing agent has a surface tension less than about 32 mN/m. This includes embodiments where the surface tension of the oil-displacing agent ranges from about 15 to about 32 mN/m. This also includes embodiments where the surface tension of the oil-displacing agent ranges from about 25 to about 30 mN/m. The surface tensions of the oil-displacing agents of the present invention are measured using the so-called pendant drop method (also referred to as pendant drop shape analysis method) as specified, for example, in "Surface tension: Pendant Drop Shape Analysis", F. K. Hansen, G. Rodsrun, J. Coll. & Inter. Sci., 141 (1991), pp. 1-12 with a Ramé-Hart F1 Series Goniometer with Drop Image Advanced Software.

In some embodiments of the present invention, the oil-displacing agent may be selected with respect to a specific hydrocarbon-containing contaminant such that the surface tension of the oil-displacing agent is less than the surface tension of the hydrocarbon-containing material. This includes embodiments where the surface tension of the hydrocarbon-containing material exceeds the surface tension of the oil-displacing agent by at least 2.5 mN/m. This also includes embodiments where the surface tension of the hydrocarbon-containing material exceeds the surface tension of the oil-displacing agent by at least 4.0 mN/m. This further includes embodiments where the surface tension of the hydrocarbon-containing material exceeds the surface tension of the oil-displacing agent by at least 8.0 mN/m. This yet further includes embodiments where the surface tension of the hydrocarbon-containing material exceeds the surface tension of the oil-displacing agent by at least 12.0 mN/m. The surface tension of hydrocarbon-containing material which is liquid at room temperature, such as mineral oil or the like, can be determined by the pendant drop method referred to above. The surface tension of hydrocarbon-containing material which is solid at room temperature, such as dry lube or the like, can be determined according to ASTM C813-90 (1994) e1 via the contact angle method.

In some embodiments of the present invention, the solubility parameter of the oil-displacing agent ranges from about 7 to about 10.5 $cal^{0.5}/cm^{3/2}$. This includes embodiments where the solubility parameter of the oil-displacing agent ranges from about 7.5 to about 9 $cal^{0.5}/cm^{3/2}$. The solubility parameters of the oil-displacing agents of the present invention are calculated with the Molecular Modeling Pro software (available from ChemSW, Inc. in Fairfield, Calif., U.S.A.) using the method disclosed in van Krevelen, D. W., "Properties of Polymers: Their Correlation with Chemical Structure Their Numerical Estimation and Prediction from Additive Group Contributions, 4th Ed., 1990, Elsevier: Amsterdam, The Netherlands, pp. 200-225. In some embodiments, the oil-displacing agent of the present invention may be selected with respect to a specific hydrocarbon-containing contaminant such that the solubility parameter of the oil-displacing agent is similar to the solubility parameter of the hydrocarbon-containing material.

In some embodiments of the present invention, the surface tension of the oil-displacing agent ranges from about 15 to about 32 mN/m, and the solubility parameter of the oil-displacing agent ranges from about 7 to about 10.5 cal$^{0.5}$/cm$^{3/2}$. In other embodiments, the surface tension of the oil-displacing agent ranges from about 25 to about 30 mN/m, and the solubility parameter of the oil-displacing agent ranges from about 7.5 to about 9 cal$^{0.5}$/cm$^{3/2}$.

The drop test in Example 1 provides an empirical method for identifying compounds that may serve as suitable oil-displacing agents in the present invention. Approximately 20 to 100 µL droplet 1 of compound to be tested is gently deposited on the surface of an adherend 2 contaminated with a selected hydrocarbon-containing material 3, as illustrated in FIG. 1. Compounds with the potential to serve as oil-displacing agents will typically spread out and cause the film of hydrocarbon-containing material to rupture. Without wishing to be bound by theory, it is believed that oil-displacing compounds will at least partially dissolve the hydrocarbon-containing material 3 when gently placed onto the contaminated adherend 2, and/or will quickly diffuse into the layer of the hydrocarbon-containing material 3. This will result in a local decrease of the surface tension of the hydrocarbon-containing material 3 thus allowing the droplet 1 of the compound to spread (FIG. 1b-c). As the droplet 1 spreads it pushes the hydrocarbon-containing material outward from the impact area. If the compound is capable of displacing a specific hydrocarbon-containing material 3 on a contaminated adherend 2, the film of the hydrocarbon-containing material 3 will at least partly rupture. The rupturing surface film carries along with it the compound which further facilitates displacement of the hydrocarbon-containing material 3.

Oil-displacing agents of the present invention typically undergo film rupture when subjected to the drop test. However, not all compounds that undergo film rupture will make good oil-displacing agents and not all oil-displacing agents may undergo film rupture. For example, n-heptane undergoes film rupture as shown in Example 1, but n-heptane has been found to perform poorly when incorporated into an epoxy-based adhesive. In particular, volatile compounds that may escape the bulk adhesive and/or compounds that do not form a co-continuous phase with the epoxy matrix are typically unsuitable as oil-displacing agents. Therefore, the drop test may be used as a relatively quick method for identifying potential oil-displacing compounds, but when taken alone the method does not guarantee the compounds will function as oil-displacing agents in the context of the present invention.

It has been found that suitable oil-displacing agents in the present invention may be selected from classes of compounds comprising aliphatic and aromatic hydrocarbons, alkyl esters, alkyl ethers, aryl esters, aryl ethers, alkyl alcohols, glycols and glycol ethers. Exemplary oil-displacing agents include 3,3-dimethyl-1,2-epoxybutane, 1,2-epoxyoctane, 1,2-epoxyhexane, 1,2-epoxybutane, 1,2-epoxydodecane, α-pinene, 2-octanol, 3,3,5-trimethylcyclohexyl methacrylate, limonene, β-pinene, 1,2-epoxydecane, 1,8-cineole, limonene oxide, α-pinene oxide, $C_1$-$C_{10}$ glycidyl ethers (e.g., methyl glycidyl ether, ethyl glycidyl ether, isopropyl glycidyl ether, n-butyl glycidyl ether, isobutyl glycidyl ether, t-butyl glycidyl ether, and EPODIL 746 and EPODIL 747 available from Air Products and Chemicals Inc. in Allentown, Pa., USA), glycidyl ester derivative of versatic acid (CARDURA™ N-10 available from Hexion Chemical in Europe), and hydroxyl acrylate monomer of glycidyl ester (ACE™ Hydroxyl Acrylate Monomer available from Hexion Chemical in Europe).

In some embodiments, the oil-displacing agent comprises at least one of 1,8-cineole, α-pinene oxide, limonene oxide, $C_1$-$C_{10}$ glycidyl ethers, and combinations thereof. In other embodiments, the oil-displacing agent comprises at least one of 1,8-cineole, $C_1$-$C_{10}$ glycidyl ethers, and combination thereof. In yet other embodiments, the oil-displacing agent comprises 1,8-cineole.

In some embodiments of the present invention, the structural adhesives comprise at least about 0.001% by weight oil-displacing agent, in some embodiments at least about 0.01% by weight oil-displacing agent, and in some embodiments at least about 2% by weight oil-displacing agent. In some embodiments of the present invention, the structural adhesives comprise less than about 50% by weight oil-displacing agent, in some embodiments less than about 25% by weight oil-displacing agent, and in some embodiments less than about 10% by weight oil-displacing agents.

Structural adhesives of the present invention may comprise from about 0.001% to about 50% by weight oil-displacing agent. In other embodiments, the structural adhesives may comprise from about 0.01% to about 25% by weight oil-displacing agent. In yet other embodiments, the structural adhesives may comprise from about 2% to about 10% by weight oil-displacing agent.

Toughening Agents

Toughening agents are polymers, other than the curable epoxy resins or the reactive liquid modifiers (described below), capable of increasing the toughness of cured epoxy resins. The toughness can be measured by the peel strength of the cured compositions. Typical toughening agents include core/shell polymers, butadiene-nitrile rubbers, acrylic polymers and copolymers, etc. Commercially available toughening agents include Dynamar™ Polyetherdiamine HC 1101 (available from 3M Corporation in St. Paul, Minn., USA) and carboxyl-terminated butadiene acrylonitrile (available from Emerald Chemical in Alfred, Me., USA).

In some embodiments, the structural adhesives of the present invention may comprise from about 5% to about 55% by weight toughening agent. In other embodiments, the structural adhesives may comprise from about 5% to about 30% by weight toughening agent. In yet other embodiments, the structural adhesives may comprise from about 5% to about 15% by weight toughening agent.

Suitable toughening agents include core/shell polymers. A core/shell polymer is understood to mean a graft polymer having a core comprising a graftable elastomer, which means an elastomer on which the shell can be grafted. The elastomer may have a glass transition temperature lower than 0° C. Typically the core comprises or consists of a polymer selected from the group consisting of a butadiene polymer or copolymer, an acrylonitrile polymer or copolymer, an acrylate polymer or copolymer and combinations thereof. The polymers or copolymers may be cross-linked or not cross-linked. In some embodiments, the core polymers are cross-linked.

Onto the core is grafted one or more polymers, the "shell". The shell polymer typically has a high glass transition temperature, i.e. a glass transition temperature greater than 26° C.

The glass transition temperature may be determined by dynamic mechanical thermo analysis (DMTA) ("Polymer Chemistry, The Basic Concepts, Paul C. Hiemenz, Marcel Dekker 1984).

The "shell" polymer may be selected from the group consisting of a styrene polymer or copolymer, a methacrylate polymer or copolymer, an acrylonitrile polymer or copolymer, or combinations thereof. The thus created "shell" may be further functionalized with epoxy groups or acid groups. Functionalization of the "shell" may be achieved, for example, by copolymerization with glycidylmethacrylate or acrylic acid. In particular, the shell may comprise acetoacetoxy moieties in which case the amount of acetoacetoxy-functionalized polymer may be reduced, or it may be completely replaced by the acetoacetoxy-functionalized core/shell polymer.

The shell of suitable core/shell polymers may comprise a polyacrylate polymer or copolymer shell such as, for example, a polymethylmethacrylate shell. The polyacrylate shell, such as the polymethylmethacrylate shell, may not be cross-linked.

The core of suitable core/shell polymers may comprise a butadiene polymer or copolymer, a styrene polymer or copolymer, or a butadiene-styrene copolymer. The polymers or copolymers making up the core, such as a butadiene-styrene core, may be cross-linked.

In some embodiments, the core/shell polymer according to the present invention may have a particle size from about 10 nm to about 1,000 nm. In other embodiments, the core/shell polymer may have a particle size from about 150 nm to about 500 nm.

Suitable core/shell polymers and their preparation are for example described in U.S. Pat. No. 4,778,851. Commercially available core/shell polymers may include, for example, PARALOID EXL 2600 and 2691 (available from Rohm & Haas Company in Philadelphia, Pa., USA) and KANE ACE MX120 (available from Kaneka in Belgium).

Reactive Liquid Modifiers

Reactive liquid modifiers may optionally be added to impart flexibility to the curable epoxy resin and enhance the effect of the toughening agent in the resultant adhesive.

Reactive liquid modifiers of the present invention may include acetoacetoxy-functionalized compounds containing at least one acetoacetoxy group, preferably in a terminal position. Such compounds include acetoacetoxy group(s) bearing hydrocarbons, such as alkyls, polyether, polyols, polyester, polyhydroxy polyester, polyoxy polyols, and combinations thereof.

The acetoacetoxy-functionalized compound may be a polymer. In some embodiments, the acetoacetoxy-functionalized compounds of the present invention may have a molecular weight of from about 100 g/mol to about 10,000 g/mol. In other embodiments, the acetoacetoxy-functionalized compounds may have a molecular weight of from about 200 g/mol to about 1,000 g/mol. In yet other embodiments, the acetoacetoxy-functionalized compounds may have a molecular weight of from about 150 g/mol to less than about 4,000 g/mol or less than about 3,000 g/mol. Suitable compounds include those having the general formula (IV).

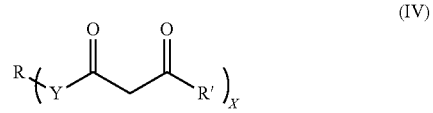

(IV)

X is an integer from 1 to 10. In some embodiments, X is an integer from 1 to 4. If the reactive liquid modifier comprises a mixture of compounds varying in X, the average number of acetoacetoxy groups per residue (R) can be a non-integer number between 1 and 10. For example, in some embodiments, the average number of acetoacetoxy groups per residue (R) may range from about 2 to 5. This includes embodiments where the average number of acetoacetoxy groups per residue (R) is about 3.5.

Y represents O, S or NH. In some embodiments, Y is O.

R represents a residue selected from the group of residues consisting of polyhydroxy alkyl, polyhydroxy aryl or a polyhydroxy alkylaryl; polyoxy alkyl, polyoxy aryl and polyoxy alkylaryl; polyoxy polyhydroxy alkyl, -aryl, -alkylaryl; polyether polyhydroxy alkyl, -aryl or -alkylaryl; or polyester polyhydroxy alkyl, -aryl or -alkylaryl, wherein when X is 1 then R is linked to Y via a carbon atom, and wherein, when X is other than 1, R is linked to Y via the number of carbon atoms corresponding to X. In some embodiments, R represents a polyether polyhydroxy alkyl, -aryl or -alkylaryl residue, or a polyester polyhydroxy alkyl, -aryl or -alkylaryl residue.

The residue R may, for example, contain from 2 to 20 or from 2 to 10 carbon atoms. The residue R may, for example, also contain from 2 to 20 or from 2 to 10 oxygen atoms. The residue R may be linear or branched.

Examples of polyester polyhydroxy residues include polyester polyhydroxy residues obtainable from condensation reactions of a polybasic carboxylic acid or anhydrides and a stoichiometric excess of a polyhydric alcohol, or obtainable from condensation reactions from a mixture of polybasic acids, monobasic acids and polyhydric alcohols. Examples of polybasic carboxylic acids, monobasic carboxylic acids or anhydrides include those having from 2 to 18 carbon atoms. In some embodiments, the polybasic carboxylic acids, the monobasic carboxylic acids or the anhydrides have from 2 to 10 carbon atoms.

Examples of polybasic carboxylic acids or anhydrides include adipic acid, glutaric acid, succinic acid, malonic acid, pimleic acid, sebacic acid, suberic acid, azelaic acid, cyclohexane-dicarboxylic acid, phthalic acid, isophthalic acid, terephthalic acid, hydrophthalic acid (e.g., tetrahydro or hexadehydrophthalic acid) and the corresponding anhydrides, as well as combinations thereof.

Examples of monobasic carboxylic acids include formic acid, acetic acid, propionic acid, butyric acid, valeric acid, caproic acid, caprylic acid, capric acid, lauric acid, myristic acid, palmitic acid, stearic acid and the like, as well as combinations thereof.

Polyhydric alcohols include those having from 2 to 18 carbon atoms. In some embodiments, the polyhydric alcohols include those having from 2 to 10 carbon atoms. Examples of polyhydric alcohols include ethylene glycol, propylene glycol, butylene glycol, hexylene glycol, pentaerythriol, glycerol and the like, including polymers thereof.

Examples of polyetherpolyol residues include those derived from polyalkylene oxides. Typically, the polyalkylene oxides contain alkylene groups from about 2 to about 8 carbon atoms. In some embodiments, the polyalkylene oxides contain alkylene groups from about 2 to about 4 carbon atoms. The alkylene groups may be linear or branched.

Examples of polyetherpolyol residues include polyethylene oxide polyol residues, polypropylene oxide polyol residues, polytetramethylene oxide polyol residues, and the like.

R' represents a $C_1$-$C_{12}$ linear or branched or cyclic alkyl such as methyl, ethyl, propyl, butyl, sec-butyl, tert-butyl, etc.

The acetoacetoxy-functionalized oligomers can be prepared by acetacetylation of polyhydroxy compounds with alkyl acetoacetates, diketene or other acetoacetylating compounds as, for example, described in EP 0 847 420 B1.

Other polyhydroxy compounds may be a copolymer of acrylates and/or methacrylates and one or more unsaturated monomers containing a hydroxyl group. Further examples of polyhydroxy polymers include hydroxyl-terminated copolymers of butadiene and acrylonitrile, hydroxy-terminated organopolysiloxanes, polytetrahydrofuran polyols, polycarbonate polyols or caprolactone based polyols.

Acetoacetoxy-functionalized polymers are commercially available, for example, as K-FLEX XM-B301 and K-FLEX 7301 (both available from King Industries in Norwalk, Conn., USA). Other acetoacetoxy-functionalized compounds include MaAcAc 1000 MW Oligomer, MaAcAc 2000 MW Oligomer, Urethane diAcAc #1, and Urethane diAcAc #2, the synthesis for each of which is described in Example 12. In some embodiments, the reactive liquid modifier comprises a tri-acetoacetate functional ester.

Reactive liquid modifiers of the present invention may also include oxamides. Suitable oxamide-based modifiers may include oxamido ester terminated polypropylene oxide, the synthesis of which is also described in Example 12.

The structural adhesives of the present invention may comprise from about 5% to about 15% by weight reactive liquid modifier. In other embodiments, the structural adhesives may comprise from about 6% to about 12% by weight reactive liquid modifier. In yet other embodiments, the structural adhesives may comprise from about 6% to about 10% by weight reactive liquid modifier.

Metal Salts

In some embodiments, structural adhesives of the present invention may comprise a metal salt catalyst. Suitable catalysts which are operable in the present compositions include the group I metals (e.g., lithium), group II metals (e.g., calcium and magnesium) or lanthanoid salts (e.g., lanthanum) wherein the anion is selected from nitrates, iodides, thiocyanates, triflates, alkoxides, perchlorates and sulfonates. Exemplary metal salts include lanthanum nitrate, lanthanum triflate, lithium iodide, lithium nitrate, calcium nitrate and their corresponding hydrates.

In general, a catalytic amount of salt is employed. In some embodiments, the structural adhesive may contain from about 0.05% to less than 3.0% by weight metal salt.

Surfactants

Surfactants may optionally be added to the structural adhesive to assist with oil displacement on a substrate. Any surfactant that is soluble within the adhesive formulation may be used, including ionic surfactants, anionic surfactants, non-ionic surfactants and zwitterionic surfactants. Exemplary surfactants include triproylene glycol monomethyl ether and polyethylene sorbitol.

Reactive Diluents

Reactive diluents may optionally be added to control the flow characteristics of the adhesive composition. Suitable diluents can have at least one reactive terminal end portion and, preferably, a saturated or unsaturated cyclic backbone. Reactive terminal end portions include glycidyl ether. Examples of suitable diluents include the diglycidyl ether of resorcinol, diglycidyl ether of cyclohexane dimethanol, diglycidyl ether of neopentyl glycol, triglycidyl ether of trimethylolpropane. Commercially available reactive diluents are for example Reactive Diluent 107 (available from Hexion Specialty Chemical in Houston, Tex.) and EPODIL 757 (available from Air Products and Chemical Inc. in Allentown, Pa.).

In some embodiments, the structural adhesive may contain from about 0.001% to 25% by weight reactive diluent.

Fillers

Fillers may optionally be added to the structural adhesives to, for example, promote adhesion, improve corrosion resistance, control the rheological properties of the adhesive, and/or reduce shrinkage during curing. Fillers may include silica-gels, Ca-silicates, phosphates, molybdates, fumed silica, clays such as bentonite, organo-clays, aluminium-trihydrates, hollow-glass-microspheres; hollow-polymeric microspheres and calcium carbonate. Exemplary commercial fillers include SHIELDEX AC5 (a synthetic amorphous silica, calcium hydroxide mixture available from W.R. Grace in Columbia, Md., USA); CAB-O-SIL TS 720 (a hydrophobic fumed silica-treated with polydimethyl-siloxane-polymer available from Cabot GmbH in Hanau, Germany); AEROSIL VP-R-2935 (a hydrophobically fumed silica available from Degussa in Düsseldorf, Germany); glass-beads class IV (250-300 microns): Micro-billes de verre 180/300 (available from CVP S.A. in France); glass bubbles K37: amorphous silica (available from 3M Deutschland GmbH in Neuss, Germany); MINSIL SF 20 (available from Minco Inc., 510 Midway, Tenn., USA); amorphous, fused silica; and APYRAL 24 ESF (epoxysilane-functionalized (2 wt %) aluminium trihydrate available from Nabaltec GmbH in Schwandorf, Germany).

Fillers of particular interest include inorganic mineral fibers, organic fibers and fibers having aspherical and/or platelet structures. Suitable fillers within this class tend to be oleophilic and when added to the structural adhesives of the present invention may increase the bond strength of an adhesive over and above that of adhesives containing other types of fillers or no filler at all. For example, replacing CAB-O-SIL TS720 (a hydrophobically fumed silica treated with polydimethyl-siloxane-polymer) with COATFORCE CF50 (a mineral fiber) in a structural adhesive containing the oil-displacing agent 1,8-cineole resulted in a 215% increase in T-peel strength (see Examples S5-A2 and S6-A2). Without wishing to be bound by theory, it is believed these fillers may absorb at least some of the hydrocarbon-containing material at the surface of an adherend thus enhancing the adhesive bond.

Inorganic mineral fibers are fibrous inorganic substances made primarily from rock, clay, slag, or glass. Mineral fibers may include fiberglass (glasswool and glass filament), mineral wool (rockwool and slagwool) and refractory ceramic fibers. Particularly suitable mineral fibers may have fiber diameters on the average of less than 10 μm. In some embodiments mineral fibers may comprise from about 37% to about 42% by weight $SiO_2$, from about 18% to about 23% by weight $Al_2O_3$, from about 34% to about 39% by weight CaO+MgO, from 0% to about 1% by weight FeO, and about 3% by weight $K_2O+Na_2O$. Commercially available fibers include, for example, COATFORCE® CF50 and COATFORCE® CF10 (available from Lapinus Fibres BV in Roermond, The Netherlands). Other fibers include wollastonite (available from Sigma-Aldrich in Milwaukee, Wis., USA).

Organic fibers may include high-density polyethylene fibers such as SYLOTHIX 52®, SYLOTHIX 53® and ARBOTHIX PE100 (available from EP Minerals in Reno, Nev., USA), SHORT STUFF® ESS2F, SHORT STUFF® ESS5F and SHORT STUFF® ESS5F (available from MiniFIBERS, INC. in Johnson City, Tenn., USA), and INHANCE® PEF (available from Inhance/Fluoro-Seal, Limited in Houston, Tex., USA). Organic fibers may also include high density aramid fibers such as INHANCE® KF (available from Inhance/Fluoro-Seal, Limited in Houston, Tex., USA)

Fillers having aspherical and/or platelet structures may include Huber 70C and Huber 2000C (available from KaMin, LLC in Macon, Ga., USA), sepiolite, bentonite, diatomaceous earth, and nanocalcites such as NPCC-201 (available from NanoMaterials Technology in Singapore).

The structural adhesives of the present invention may comprise from about 0.001% to about 50% by weight filler. This includes embodiments where the amount of filler in the structural adhesive ranges from about 2% to about 30% by weight filler and more particularly from about 2% to about 10% by weight filler.

In some embodiments, the structural adhesives of the present invention comprise at least one of inorganic mineral fibers, organic fibers, fillers having aspherical and/or platelet structures, and combinations thereof. In other embodiments, the structural adhesives comprise inorganic mineral fibers. In yet other embodiments, the structural adhesives comprise organic fibers.

Pigments

Pigments may include inorganic or organic pigments including ferric oxide, brick dust, carbon black, titanium oxide and the like.

Structural Adhesive Compositions

Two-part compositions according to the present invention comprise a Part 1 and, separate therefrom, a Part 2. Part 1 comprises a curable epoxy resin and Part 2 comprises an amine curing agent. Part 2 may comprise curable epoxy resin in addition to that in Part 1. When used, reactive liquid modifiers are typically added to Part 1. As for any remaining ingredients (e.g., toughening agents, oil-displacing agents, secondary curatives, fillers, reactive diluents, metal salts, surfactants, pigments, etc.), compounds with epoxy reactive groups are added to Part 2, compounds with amine reactive groups are added to Part 1, and compounds that do not contain either an epoxy reactive group or an amine reactive group may be added to Part 1, Part 2 or a combination thereof. Alternatively, a separate part for one or more of these ingredients may be contemplated.

In some embodiments, Part 1 comprises a curable epoxy resin, a toughening agent, and an oil-displacing agent, and Part 2 comprises an amine curing agent and a secondary curative. In other embodiments, a filler is added to Part 1 and/or Part 2, wherein the filler comprises at least one of an inorganic mineral fiber, an organic fiber, a fiber having aspherical and/or platelet structure, and combinations thereof.

The two-part structural adhesive is prepared by mixing Parts 1 and 2 together. The amounts of Part 1 and Part 2 will depend upon the desired epoxy to amine hydrogen molar ratio in the structural adhesive. In some embodiments, structural adhesives of the present invention may have a molar ratio of epoxy moieties on the curable epoxy resin to amine hydrogens on the amine curing agent ranging from about 0.5:1 to about 3:1. In other embodiments, the molar ratio is about 2:1. In yet other embodiments, the molar ratio is about 1:1. The respective amounts of Part 1 and Part 2 are preferably mixed together immediately prior to use.

The structural adhesives of the present invention may have, when cured, one or more of the following mechanical properties: a cohesive strength, as measured by overlap shear, of at least 2500 psi; reasonable cure time; adherence to clean metal surfaces; and adherence to metal surfaces contaminated with hydrocarbon-containing material, such as various oils and lubricants.

Curing

The structural adhesives of the present invention are room temperature curable and/or heat curable. In some embodiments, the adhesive may be cured at room temperature for at least 3 hours. This includes embodiments where the adhesive is cured at room temperature for at least 24 hours. This also includes embodiments where the adhesive is cured at room temperature for at least 72 hours.

In other embodiments, the adhesive is cured at room temperature followed by a post cure. This includes embodiments where the adhesive is cured at room temperature for about 18 hours followed by a post cure at about 180° for about 30 minutes.

In further embodiments, the adhesive may reach a desirable cohesive strength after short heat curing periods. Since the cohesive strength can still increase when curing the composition at the same conditions for longer periods, this kind of curing is referred to herein as partial curing. In principle, partial curing can be carried out by any kind of heating. In some embodiments, induction curing (e.g., spot induction curing or ring induction curing) may be used for partial curing. Induction curing is a non-contact method of heating using electric power to generate heat in conducting materials by placing an inductor coil through which an alternating current is passed in proximity to the material. The alternating current in the work coil sets up an electromagnetic field that creates a circulating current in the work piece. This circulating current in the work piece flows against the resistivity of the material and generates heat. Induction curing equipment can be commercially obtained, for example, EWS from IFF-GmbH in Ismaning, Germany.

In yet a further embodiment, adhesives of the present invention may undergo an induction cure, followed by a room temperature cure and a post cure.

Bond Strength

It is desirable for the two-part epoxy-based adhesive to build a strong, robust bond to one or more substrates upon curing. A bond is considered robust if the bond breaks apart cohesively at high shear values when tested in an overlap shear test and high T-peel values when tested in a T-peel test. The bonds may break in three different modes: (1) the adhesive splits apart, leaving portions of the adhesive adhered to both metal surfaces in a cohesive failure mode; (2) the adhesive pulls away from either metal surface in an adhesive failure mode; or (3) a combination of adhesive and cohesive failure (i.e., mixed mode failure). Structural adhesives of the present invention may exhibit a combination of adhesive and cohesive failure, more preferably cohesive failure during overlap shear testing and T-peel testing. The adhesive may be applied to clean substrates or oiled substrates.

In some embodiments, structural adhesives of the present invention may have a lap shear strength of at least 1,000 psi when cured at room temperature for about 18 hours followed by 180° C. for 30 minutes. In other embodiments, the structural adhesives may have a lap shear strength of at least 2500 psi. In yet other embodiments, the structural adhesives may have a lap shear strength of at least 4000 psi.

In some embodiments, the structural adhesives of the present invention may have a T-peel strength of at least 5 lb$_f$/in-width when cured at room temperature for about 18 hours followed by 180° C. for 30 minutes. In other embodiments, the structural adhesives may have a T-peel strength of at least 20 lb$_f$/in-width. In yet other embodiments, the structural adhesives may have a T-peel strength of at least 30 lb$_f$/in-width.

Structural adhesives of the present invention may have a lap shear strength of at least 1,000 psi and a T-peel strength of at least 5 lb/in-width when cured at room temperature for about 18 hours followed by 180° C. for 30 minutes. Additionally, structural adhesives of the present invention may have a lap shear strength of at least 2500 psi and a T-peel strength of at least 20 lb/in-width when cured at room temperature for about 18 hours followed by 180° for 30 minutes. Furthermore, structural adhesives of the present invention may have a lap shear strength of at least 4000 psi and a T-peel strength of at least 30 lb/in-width when cured at room temperature for about 18 hours followed by 180° for 30 minutes.

Use of Adhesive Compositions

The present adhesive compositions may be used to supplement or completely eliminate a weld or mechanical fastener by applying the adhesive composition between two parts to be joined and curing the adhesive to form a bonded joint. Suitable substrates onto which the adhesive of the present invention may be applied include metals (e.g., steel, iron, copper, aluminum, etc., including alloys thereof), carbon fiber, glass fiber, glass, epoxy fiber composites, wood, and mixtures thereof. In some embodiments, at least one of the substrates is a metal. In other embodiments, both substrates are metal.

The surface of the substrates may be cleaned prior to application of the structural adhesive. However, the structural adhesives of the present invention are also useful in applications where the adhesives are applied to substrates having hydrocarbon-containing material on the surface. In particular, the structural adhesives may be applied to steel surfaces contaminated with mill oil, cutting fluid, draw oil, and the like.

In areas of adhesive bonding, the adhesive can be applied as liquid, paste, and semi-solid or solid that can be liquefied upon heating, or the adhesive may be applied as a spray. It can be applied as a continuous bead, in intermediate dots, stripes, diagonals or any other geometrical form that will conform to forming a useful bond. In some embodiments, the adhesive composition is in a liquid or paste form.

The adhesive placement options may be augmented by welding or mechanical fastening. The welding can occur as spot welds, as continuous seam welds, or as any other welding technology that can cooperate with the adhesive composition to form a mechanically sound joint.

The compositions according to the present invention may be used as structural adhesives. In particular, they may be used as structural adhesives in vehicle assembly, such as the assembly of watercraft vehicles, aircraft vehicles or motorcraft vehicles, such as cars, motor bikes or bicycles. In particular, the adhesive compositions may be used as hem-flange adhesives. The adhesive may also be used in body frame construction. The compositions may also be used as structural adhesives in architecture or as structural adhesives in household and industrial appliances.

In some embodiments, the present invention provides a method of making a composite article, the method comprising applying the two-part adhesive of the present invention to a surface, and curing the two-part adhesive in contact with the surface to form a composite article.

In other embodiments, the present invention provides a method of forming a bonded joint between members, the method comprising applying the two-part adhesive of the present invention to a surface of at least one of two or more members, joining the members so that the two-part adhesive is sandwiched between the two or more members, and curing the two-part adhesive to form a bonded joint between the two or more members.

The composition according to the invention may also be used as welding additive.

The composition may be used as a metal-metal adhesive, metal-carbon fiber adhesive, carbon fiber-carbon fiber adhesive, metal-glass adhesive, and carbon fiber-glass adhesive.

Exemplary embodiments of the two-part epoxy-based structural adhesives are provided in the following examples. The following examples are presented to illustrate the structural adhesive and methods for applying the structural adhesive and to assist one of ordinary skill in making and using the same. The examples are not intended in any way to otherwise limit the scope of the invention.

EXAMPLES

Materials Employed

AEROSIL VP-R-2935 (available from Degussa in Düsseldorf, Germany) is a hydrophobically fumed silica.

ANCAMINE K54 (available from Air Products and Chemicals Inc. in Allentown, Pa., USA) is a technical grade tris-2,4,6-dimethylaminomethyl-phenol catalytic tertiary amine additive.

t-butyl acetoacetate (available from Aldrich Chemical Company in Milwaukee, Wis., USA).

n-Butyl Glycidyl Ether (available from Alfa Aesar in Ward Hill, Mass., USA).

tert-Butyl Glycidyl Ether (available from TCI America in Portland, Oreg., USA).

CAB-O-SIL TS720 (available from Cabot in Billerica, Mass., USA) is a hydrophobically fumed silica treated with polydimethyl-siloxane-polymer.

CedarDraw 303PX2 Barium Free (available from ITW Rocol North America in Glenview, Ill., USA) is lubricating oil.

1,8-Cineole (available from Alfa Aesar in Ward Hill, Mass., USA).

COATFORCE® CF50 (available from Lapinus Fibres BV in Roermond, The Netherlands) is a mineral fiber.

n-Decane (available from Alfa Aesar in Ward Hill, Mass., USA).

1,2,7,8-diepoxyoctane (available from Alfa Aesar in Ward Hill, Mass., USA).

Diethyloxalate (available from Alfa Aesar in Ward Hill, Mass., USA).

EPALLOY 5000 (available from CVC Specialty Chemicals, Moorestown, N.J.) is the diglycidyl ether of hydrogenated bis-phenol A having an approximate epoxy equivalent weight of 210.

EPODIL 746 (available from Air Products and Chemicals Inc. in Allentown, Pa., USA) is 2-ethylhexyl glycidyl ether.

EPODIL 747 (available from Air Products and Chemicals Inc. in Allentown, Pa., USA) is an aliphatic glycidyl ether comparable to Epoxide 7.

EPODIL 748 (available from Air Products and Chemicals Inc. in Allentown, Pa., USA) is a reactive diluent based on an aliphatic glycidyl ether comparable to Epoxide 8.

EPODIL 757 (available from Air Products and Chemicals Inc. in Allentown, Pa., USA) is a reactive diluent based on 1,4-cyclohexandimethanoldiglycidylether.

EPON 828 (available from Hexion Specialty Chemicals in Houston, Tex., USA) is the diglycidylether of bis-phenol A having an approximate epoxy equivalent weight of 187.5.

EPONEX 1510 (available from Hexion Specialty Chemicals in Houston, Tex., USA) is the diglycidyl ether of hydrogenated bis-phenol A having an approximate epoxy equivalent weight of 210.

Ethyl acetate (available from Alfa Aesar in Ward Hill, Mass., USA).

Ethyl Glycidyl Ether (available from TCI America in Portland, Oreg., USA).

Glass beads, 212-300 μm in diameter (available from Sigma-Aldrich in Milwaukee, Wis., USA) used as spacers.

(3-Glycidyloxypropyl)trimethoxysilane (available from Alfa Aesar in Ward Hill, Mass., USA).

n-Heptane (available from Alfa Aesar in Ward Hill, Mass., USA).

HUBER 70C (available from KaMin, LLC in Macon, Ga., USA) is a calcined kaolin clay.

HUBER 2000C (available from KaMin, LLC in Macon, Ga., USA) is a calcined kaolin clay.

INHANCE® PEF (available from Inhance/Fluoro-Seal, Limited in Houston, Tex., USA) is a high density fibrillated polyethylene fiber having a diameter of 20 μm that has been surface activated.

INHANCE® KF (available from Inhance/Fluoro-Seal, Limited in Houston, Tex., USA) is a high density fibrillated aramid fiber having a diameter of 20 μm that has been surface activated.

IOTGA (available from TCI America in Portland, Oreg., USA) is an isooctyl ester of thioglycidic acid.

Isobutyl Glycidyl Ether (available from Sigma-Aldrich in Milwaukee, Wis., USA).

Isodecyl benzoate (available from Sigma-Aldrich in Milwaukee, Wis., USA).

Isopropyl Glycidyl Ether (available from TCI America in Portland, Oreg., USA).

JEFFAMINE® D-400 Polyetheramine (available from Hunstman Corporation in The Woodlands, Tex., USA).

KANEKA ACE MX125 (available from Kaneka Texas Corporation, Houston, Tex.) is the diglycidyl ether of bisphenol A containing 25% w/w loading of core-shell rubber particles.

K-FLEX XM-311 (available from King Industries in Norwalk, Conn., USA) is a polyurethane polyol.

K-FLEX XMB-301 (available from King Industries in Norwalk, Conn., USA) is a tri-acetoacetate functional ester.

K-FLEX UD-320-1000 (available from King Industries in Norwalk, Conn., USA) is a polyurethane polyol.

(+)-Limonene (available from TCI America in Portland, Oreg., USA).

(+)-Limonene oxide (available from Sigma-Aldrich in Milwaukee, Wis., USA).

Limonene dioxide (available from Pfaltz and Bauer, Inc. in Waterbury, Conn., USA).

MaAcAc (available from Aldrich Chemical Company in Milwaukee, Wis., USA) is 2-(methacryloyloxy)ethyl acetoacetate.

Methyl Glycidyl Ether (available from TCI America in Portland, Oreg., USA).

MULTIDRAW® KTL N16 (available from Zeller+Gmelin GmbH & Co. KG in Eislingen, Germany) is a deep-draw oil.

Music wire (0.005" and 0.010" in diameter) (available from Small Parts Inc. in Miramar, Fla.).

NPCC-201 is a nanocalcite (available from NanoMaterials Technology in Singapore).

1-Octanol (available from Alfa Aesar in Ward Hill, Mass., USA).

2-Octanol (available from Alfa Aesar in Ward Hill, Mass., USA).

OEST B804/3 COW-1 (available from Oest Mineralölwerk GmbH & Co. KG in Freudenstadt, Germany) is a deep-draw oil.

PARALOID EXL 2600 (available from Rohm and Haas Company in Philadelphia, Pa., USA) is a methacrylate/butadiene/styrene polymer with a core/shell architecture (core cross-linked rubber comprising of a polybutadiene-co-polystyrene-copolymer; shell: polymethacrylate) with a particle size of ca. 250 nm.

PARALOID EXL 2691 (available from Rohm and Haas Company in Philadelphia, Pa., USA) is a methacrylate/butadiene/styrene polymer with a core/shell architecture (core cross-linked rubber comprising of a polybutadiene-co-polystyrene-copolymer; shell: polymethacrylate) with a particle size of ca. 250 nm.

α-pinene (available from TCI America in Portland, Oreg., USA).

α-pinene oxide (available from Sigma-Aldrich in Milwaukee, Wis., USA).

β-pinene (available from TCI America in Portland, Oreg., USA).

β-pinene oxide (available from Acros Organics in Geel, Belgium).

Polysorbate 80 (obtained from Alfa Aesar in Ward Hill, Mass., USA) is polyethyleneglycol sorbital.

SHIELDEX AC5 (available from W.R. Grace in Columbia, Md., USA) is a calcium-treated fumed silica corrosion inhibitor.

SHORT STUFF® ESS2F (available from MiniFIBERS, INC. in Johnson City, Tenn., USA) is dried, fibrillated polyethylene pulp with a length of 600 μm and a diameter of 5 μm.

SHORT STUFF® ESS5F (available from MiniFIBERS, INC. in Johnson City, Tenn., USA) is dried, fibrillated polyethylene pulp with a length of 100 μm and a diameter of 5 μm.

SHORT STUFF® ESS5F (available from MiniFIBERS, INC. in Johnson City, Tenn., USA) is dried, fibrillated polyethylene pulp that has a hydrophilically treated surface with a length of 100 μm and a diameter of 5 μm.

SILANE Z-6040 (available from Dow Corning, Midland, Mich.) is (3-Glycidyloxypropyl)trimethoxysilane.

SYLOTHIX 52® (available from EP Minerals in Reno, Nev., USA) is a combination of 400 μm long polyethylene fibers and synthetic amorphous silicic acid.

SYLOTHIX 53® (available from EP Minerals in Reno, Nev., USA) is a combination of 100 μm long polyethylene fibers and synthetic amorphous silicic acid.

Tripropylene glycol monomethyl ether (available from TCI America in Portland, Oreg., USA).

TTD (available from TCI America in Portland, Oreg., USA) is 4,7,10-trioxa-1,13-tridecane diamine.

VAZO-67 or AIBN (available from DuPont Chemicals in Wilmington, Del., USA) is azoisobutyronitrile.

Wollastonite (available from Sigma-Aldrich in Milwaukee, Wis., USA) is calcium silicate.

Preparation of Test Panels

Preparation of Test Specimens was Based Upon American Society for Testing and Materials (ASTM) Specification D 6386-99 and Society for Protective Coatings Surface Preparation Specifications and Practices, Surface Preparation Specification No. 1.

Cleaned Steel Panels.

Iron phosphated steel panels (Type "RS" Steel, 4"×1"×0.063" or 4"×6"×0.063", Square Corners, Iron Phosphated (B-1000) available from Q-Lab Corporation in Cleveland, Ohio) or cold-rolled steel panels (Type "S" Steel, 12"×1"×0.032", Square Corners, 1010 CRS available from Q-Lab Corporation in Cleveland, Ohio) were wiped with a 50:50 mixture of heptane to acetone. The panels were then dipped for 60 seconds in an alkaline cleaner bath (45 g/L of sodium triphosphate and 45 g/L of Alconox cleaner) maintained at 80° C. The panels were subsequently rinsed in distilled deionized water and dried in an oven at 80° C. The ground side of the panel was used for all testing.

Oiled Steel Panels.

Oiled steel panels were prepared by applying a sufficient volume of oil to the cleaned steel panels (described above) to achieve a coating of 3 g/m² for the area to be coated, using density data obtained from the appropriate oil Material Safety Data Sheet (MSDS). A clean fingertip of a nitrile glove was used to carefully spread the oil uniformly over the surface. The surface was then covered and the steel panel was stored at room temperature for 24 hours prior to use.

Etched Aluminum Panels.

Aluminum panels (4"×7"×0.063" or 3"×8"×0.025" 2024-T3 bare aluminum) were etched using the Optimized Forest Products Laboratory (FPL) process. The aluminum panels were immersed for 10 minutes in an alkaline degreaser (15,308.74 grams ISOPREP 44 to 63 gallons of water) maintained at 88° C. The aluminum panels were removed from the degreaser and rinsed with tap water. The panels were then immersed for 10 minutes in an FPL etch bath (10,697 grams sodium dichromate, 72,219 grams 96% sulfuric acid, 358 grams 2024T3 bare aluminum, and 63.1 gallons water) maintained at 55-60° C. After removal from the etch bath, the panels were rinsed with tap water, air dried for 10 minutes, and then force dried for an additional 10 minutes at 55-60° C.

Lap Shear Strength Measurements

Lap shear specimens were made using 4"×1"×0.063" steel panels or 4"×7"×0.063" 2024-T3 etched aluminum panels. Each specimen was prepared according to ASTM Specification D 1002-05. A strip of approximately ½" wide and 0.010" thick of adhesive was applied to one edge of each of the two panels (i.e., adherends) using a scraper. Spacers were used to control the thickness of the adhesive layer. In one method (Method 1), glass beads (212-300 μm in diameter) within the adhesive served as spacers. In an alternative method (Method 2), two 0.005" music wires were placed on each edge of the bond (parallel to the direction of shear) to serve as spacers. The bond was closed and clamped using a 1" binder clip to apply pressure to provide for adhesive spreading. At least five bonds were made for each testing condition. The adhesive was cured, and the bonds were tested to failure at room temperature on a Sintech Tensile Testing machine using a crosshead displacement rate of 0.1"/min. The failure load was recorded, and the lap width was measured with a vernier caliper. The quoted lap shear strengths were calculated as failure load/(measured width of the bond×measured length of the bond). The average and standard deviation were calculated from the results of at least five tests unless otherwise noted.

T-Peel Strength Measurements

T-peel specimens were made using either the cleaned steel panels measuring 12"×1"×0.032" or the etched aluminum panels measuring 3"×8"×0.025". Each specimen was generated as described in ASTM D-1876 and summarized below.

Adhesive was applied to metal panels using one of three methods.

(Method 1) Two steel panels (i.e., adherends) were placed side-by-side and a strip of approximately 1"×9"×0.010" of adhesive was applied to each adherend. Glass beads (212-300 μm in diameter) within the adhesive served as spacers.

(Method 2) Two etched aluminum panels (i.e., adherends) were placed side by side and a strip of approximately 2"×5"×0.010" of adhesive was applied to each adherend. 10 mL thick spacers made from brass shims were applied to the edges of the bonded area for bondline thickness control.

(Method 3) Two steel panels (i.e., adherends) were placed side-by-side and a strip of approximately 1"×9"×0.010" of adhesive was applied to each adherend. Three 0.010" music wires were placed perpendicular to the direction of peel in the bond, one at the start of the bond, one approximately in the middle of the bond, and one at the end of the bond to serve as spacers.

After the adhesive was applied to each adherend, the bond was closed and adhesive tape was applied to hold the adherends together during the curing phase. The adhesive bonds were placed between sheets of aluminum foil and also between pieces of cardboard. Two 14# steel plates were used to apply pressure for adhesive spreading. After the adhesive had cured, the larger specimen was cut into 1" wide samples, yielding two 1" wide specimens. The bonds were tested to failure at room temperature on a Sintech Tensile Testing machine using a crosshead displacement rate of 12"/min. The initial part of the loading data was ignored. The average load was measured after about 1" was peeled. The quoted T-peel strength is the average of at least two peel measurements.

Example 1

Identification of Oil-Displacing Compounds

Drop Test.

The compounds in Table 1 were drop tested on 4"×6"×0.063" oiled steel panels to assess their ability to displace hydrocarbon-containing material on the surface of steel. The oiled steel panels were prepared as described above with 3 g/m² of MULTIDRAW® KTL N16 oil.

The drop test was performed by applying a 100 μL droplet of the respective compound to an oiled steel panel. If upon application to the steel panel the droplet spread out and the film ruptured, the compound was classified as an oil-displacing compound. If, on the other hand, the droplet remained stagnant, the compound was not classified as an oil-displacing compound. All compounds that exhibited oil-displacing behavior with MULTIDRAW® KTL N16 oil are identified by an asterisk (*) in Table 1.

TABLE 1

| Compounds Tested | Surface Tension (mN/m) | Solubility Parameter (cal$^{0.5}$/cm$^{3/2}$) | Density (g/cm³) |
|---|---|---|---|
| 1H,1H,2H-Perfluoro(1,2-Epoxy)hexane* | 15.6 | 9.43 | 1.5 |
| 3-[2-(Perfluorohexyl)ethoxy]1,2-Epoxypropane* | 18.3 | 9.17 | 1.57 |
| n-Heptane* | 20.3 | 7.19 | 0.68 |
| 3,3-Dimethyl-1,2-Epoxybutane* | 21.4 | 8.11 | 0.82 |
| n-Decane* | 22.7 | 7.41 | 0.73 |
| 1,2-Epoxyoctane* | 23.2 | 8.12 | 0.84 |
| 3-aminopropyltriethoxysilane* | 23.5 | 9.37 | 0.95 |
| VeoVa10* | 23.8 | 8.42 | 0.89 |
| Glycidyl 2,2,3,3,4,4,5,5,6,6,7,7,8,8,9,9-hexadecafluorononyl ether | 23.9 | 8.18 | 1.68 |
| 1,2-Epoxyhexane* | 23.9 | 8.31 | 0.83 |
| 1,2-Epoxybutane* | 24.3 | 8.31 | 0.83 |
| Isodecyl Methacrylate* | 24.4 | 8.42 | 0.88 |
| Ethyl Glycidyl Ether* | 24.8 | 8.95 | 0.94 |
| 1,2-Epoxydodecane* | 25.1 | 8.08 | 0.84 |
| 1-Octanol* | 25.2 | 9.66 | 0.83 |
| Diethylhexyl Maleate* | 25.6 | 8.60 | 0.94 |
| Mixture of Diisobutyl Adipate, Succinate, Glutimate* | 26.2 | | 0.95 |
| α-Pinene* | 26.3 | 8.06 | 0.86 |
| t-Butyl Glycidyl Ether* | 26.3 | 8.63 | 0.92 |
| 2-Octanol* | 26.5 | 9.57 | 0.81 |
| 1,2,7,8-Diepoxyoctane | 26.6 | 9.07 | 0.99 |
| Isopropyl Glycidyl Ether* | 26.7 | 8.67 | 0.92 |
| Isobutyl Glycidyl Ether* | 26.7 | 8.57 | 0.91 |
| 3,3,5-Trimethylcyclohexyl Methacrylate* | 26.7 | 8.10 | 0.93 |

TABLE 1-continued

| Compounds Tested | Surface Tension (mN/m) | Solubility Parameter (cal$^{0.5}$/cm$^{3/2}$) | Density (g/cm$^3$) |
|---|---|---|---|
| Limonene* | 26.9 | 8.02 | 0.84 |
| Tributyl Citrate* | 26.9 | 10.24 | 1.05 |
| Tributyl Phosphate* | 26.9 | 9.17 | 0.98 |
| Dibutyl Maleate* | 27.6 | 9.08 | 0.99 |
| β-Pinene* | 27.8 | 8.33 | 0.86 |
| 1,2-Epoxydecane* | 27.8 | 8.10 | 0.84 |
| n-Butyl Glycidyl Ether* | 27.9 | 8.68 | 0.92 |
| EPODIL 747* | 28.3 | 7.96 | 0.90 |
| Dibutyl Fumarate* | 28.7 | 9.08 | 0.99 |
| CARDURA ™ N-10* | 28.9 | 8.84 | 0.945-0.965 |
| Methyl Oleate* | 29.0 | 8.19 | 0.88 |

TABLE 1-continued

| Compounds Tested | Surface Tension (mN/m) | Solubility Parameter (cal$^{0.5}$/cm$^{3/2}$) | Density (g/cm$^3$) |
|---|---|---|---|
| 1,8-Cineole* | 29.3 | 8.65 | 0.92 |
| EPODIL 746* | 29.4 | 8.36 | 0.91 |
| Isodecyl Benzoate* | 29.6 | 9.19 | 0.95 |
| Allyl Glycidyl Ether | 29.9 | 8.93 | 0.97 |
| β-Pinene Oxide | 30.2 | 9.00 | 0.98 |
| 1,2-Epoxycyclopentane | 30.4 | 9.13 | 0.96 |
| 1,3-Bis(Glycidoxypropyl)-tetramethyldisiloxane | 30.4 | 8.63 | 1.00 |
| Methyl Glycidyl Ether | 30.7 | 9.18 | 0.98 |
| Dimethyl Adipate | 31.2 | 9.58 | 1.06 |
| 2,(3,4-Epoxycyclohexyl)-Ethyl Trimethoxysilane | 31.2 | 8.70 | 1.07 |
| Limonene Oxide* | 31.4 | 8.80 | 0.93 |
| α-Pinene Oxide* | 31.4 | 8.89 | 0.96 |
| Cyclohexene Oxide | 31.6 | 8.93 | 0.97 |
| Triethyl Citrate | 32.1 | 11.10 | 1.18 |
| OIL | | | |
| MULTIDRAW ® KTL N16 | 38.2 | | |

*Denotes oil-displacing compounds.

The solubility parameters and surface tension values for each compound in Table 1 are also provided. Solubility parameters were calculated with the Molecular Modeling Pro software (available from ChemSW, Inc. in Fairfield, Calif., U.S.A.) using the method disclosed in van Krevelen, D. W., "Properties of Polymers: Their Correlation with Chemical Structure: Their Numerical Estimation and Prediction from Additive Group Contributions, 4$^{th}$ Ed., 1990, Elsevier: Amsterdam, The Netherlands, pp. 200-225.

The surface tension values were measured according to the so-called pendant drop method (also referred to as pendant drop shape analysis method) as specified, for example, in "Surface tension: Pendant Drop Shape Analysis", F. K. Hansen, G. Rodsrun, J. Coll. & Inter. Sci., 141 (1991), pp. 1-12 with a Ramé-Hart F1 Series Goniometer with Drop Image Advanced Software.

Generally, the compounds that demonstrated oil-displacing behavior (i.e., marked by the oil film rupture) had low solubility parameters (7.19 to 10.24 cal$^{0.5}$/cm$^{3/2}$) and surface tension values lower than the oil tested (with oil-displacing compounds having a surface tension ranging from 15.6 to 31.4 mN/m as determined by the pendant drop test).

Example 2

Comparison of 2-Part Epoxy Adhesives with and without Oil-Displacing Agents

Epoxy Formulation (Part 1).
The epoxy formulation was prepared as summarized in Table 2 and described in further detail below.

TABLE 2

| Ingredients* | E2-A1 (g) | E2-A2 (g) | E2-B1 (g) | E2-B2 (g) | E2-C1 (g) | E2-C2 (g) | E2-D1 (g) | E2-D2 (g) |
|---|---|---|---|---|---|---|---|---|
| EPON 828 | 100 | 100 | 100 | 100 | 100 | 100 | 100 | 100 |
| 1,8-Cineole | | 5 | | 5 | | 5 | | 5 |
| PARALOID EXL 2691 | 15 | 15 | 15 | 15 | 15 | 15 | | |
| COATFORCE ® CF50 | | | 8 | 8 | | | | |
| SYLOTHIX 53 ® | | | | | 8 | 8 | 8 | 8 |

*Epoxy Formulations E2-A2, B2, C2 and D2 contain the oil-displacing agent 1,8-cineole. The remaining formulations do not contain an oil-displacing agent.

Preparation of Epoxy Formulation E2-A1.
A one pint metal can was charged with 100 grams of EPON 828. 15 grams of PARALOID EXL 2691 were slowly added and mixed into the EPON 828 mixture over the course of 15 minutes. This mixture was subsequently heated to 80° C. and maintained at that temperature for 90 minutes. The EPON 828 mixture was removed from the heat and allowed to cool to room temperature. In all stages of the process, the solution was continuously stirred. After all ingredients were added, the EPON 828 mixture was degassed and stored in a closed container at room temperature until use.

Preparation of Epoxy Formulation E2-A2.
A one pint metal can was charged with 100 grams of EPON 828 and 5 grams of 1,8-cineole. This mixture was mixed until homogenized. 15 grams of PARALOID EXL 2691 were slowly added and mixed into the EPON 828 mixture over the course of 15 minutes. This mixture was subsequently heated to 80° C. and maintained at that temperature for 90 minutes. The EPON 828 mixture was removed from the heat and allowed to cool to room temperature. In all stages of the process, the solution was continuously stirred. After all ingredients were added, the EPON 828 mixture was degassed and stored in a closed container at room temperature until use.

Preparation of Epoxy Formulation E2-B1.
A one pint metal can was charged with 100 grams of EPON 828. 15 grams of PARALOID EXL 2691 were slowly added and mixed into the EPON 828 mixture over the course of 15 minutes. This mixture was subsequently heated to 80° C. and maintained at that temperature for 90 minutes. The EPON 828 mixture was removed from the heat and allowed to cool to room temperature. 8 grams of Lapinus COATFORCE® CF50 were added to the mixture, and stirred for 5 minutes. In all stages of the process, the solution was continuously stirred. After all ingredients were added, the EPON 828 mixture was degassed and stored in a closed container at room temperature until use.

Preparation of Epoxy Formulation E2-B2.
A one pint metal can was charged with 100 grams of EPON 828 and 5 grams of 1,8-cineole. This mixture was mixed until homogenized. 15 grams of PARALOID EXL 2691 were slowly added and mixed into the EPON 828 mixture over the course of 15 minutes. This mixture was subsequently heated to 80° C. and maintained at that temperature for 90 minutes. The EPON 828 mixture was removed from the heat and allowed to cool to room temperature. 8 grams of Lapinus COATFORCE® CF50 were added to the mixture, and stirred for 5 minutes. In all stages of the process, the solution was continuously stirred. After all ingredients were added, the EPON 828 mixture was degassed and stored in a closed container at room temperature until use.

Preparation of Epoxy Formulation E2-C1.

A one pint metal can was charged with 100 grams of EPON 828. 15 grams of PARALOID EXL 2691 were slowly added and mixed into the EPON 828 mixture over the course of 15 minutes. This mixture was subsequently heated to 80° C. and maintained at that temperature for 90 minutes. The EPON 828 mixture was removed from the heat and allowed to cool to room temperature. 8 grams of SYLOTHIX 53® were added to the mixture, and stirred for 5 minutes. In all stages of the process, the solution was continuously stirred. After all ingredients were added, the EPON 828 mixture was degassed and stored in a closed container at room temperature until use.

Preparation of Epoxy Formulation E2-C2.

A one pint metal can was charged with 100 grams of EPON 828 and 5 grams of 1,8-cineole. This mixture was mixed until homogenized. 15 grams of PARALOID EXL 2691 were slowly added and mixed into the EPON 828 mixture over the course of 15 minutes. This mixture was subsequently heated to 80° C. and maintained at that temperature for 90 minutes. The EPON 828 mixture was removed from the heat and allowed to cool to room temperature. 8 grams of SYLOTHIX 53® were added to the mixture, and stirred for 5 minutes. In all stages of the process, the solution was continuously stirred. After all ingredients were added, the EPON 828 mixture was degassed and stored in a closed container at room temperature until use.

Preparation of Epoxy Formulation E2-D1.

A one pint metal can was charged with 100 grams of EPON 828. 8 grams of SYLOTHIX 53® were added to the mixture, and stirred for 5 minutes. After all ingredients were added, the EPON 828 mixture was degassed and stored in a closed container at room temperature until use.

Preparation of Epoxy Formulation E2-D2.

A one pint metal can was charged with 100 grams of EPON 828 and 5 grams of 1,8-cineole. This mixture was mixed until homogenized. 8 grams of SYLOTHIX 53® were added to the mixture, and stirred for 5 minutes. After all ingredients were added, the EPON 828 mixture was degassed and stored in a closed container at room temperature until use.

Amine Formulation A1 (Part 2).

In a 600 mL glass beaker, 117 grams of TTD were mixed with 25.4 grams of ANCAMINE K54 at room temperature using a propeller mixer. The mixture was stirred until homogenized, and then it was degassed and stored in a closed container at room temperature until use.

Adhesives.

The quantities of amine formulation (Part 2) and epoxy formulation (Part 1) used to make each adhesive are summarized in Table 3. Each adhesive was made by mixing Amine Formulation A1 with the respective epoxy formulation in a metal cup until homogeneous.

TABLE 3

| Ingredients* | S2-A1 (g) | S2-A2 (g) | S2-B1 (g) | S2-B2 (g) | S2-C1 (g) | S2-C2 (g) | S2-D1 (g) | S2-D2 (g) |
|---|---|---|---|---|---|---|---|---|
| Amine Formulation A1 | 3.0 | 3.0 | 3.0 | 3.0 | 3.0 | 3.0 | 3.0 | 3.0 |
| Epoxy Formulation E2-A1 | 20.28 | | | | | | | |
| Epoxy Formulation E2-A2 | | 21.16 | | | | | | |
| Epoxy Formulation E2-B1 | | | 21.69 | | | | | |
| Epoxy Formulation E2-B2 | | | | 22.57 | | | | |
| Epoxy Formulation E2-C1 | | | | | 10.84 | | | |
| Epoxy Formulation E2-C2 | | | | | | 11.29 | | |
| Epoxy Formulation E2-D1 | | | | | | | 9.52 | |
| Epoxy Formulation E2-D2 | | | | | | | | 9.96 |
| Cure | RT/180° | RT/180° | RT/180° | RT/180° | RT only | RT only | RT only | RT only |
| Lap Shear (psi)/ Failure Mode | 4314 ± 480 Adhesive | 4200 ± 333 Adhesive | 4263 ± 622 Adhesive | 4949 ± 334 Cohesive | 4241 ± 177 Cohesive | 3485 ± 529 Cohesive | 1436 ± 325 Mixed | 2177 ± 295 Cohesive |
| T-Peel (lb/in-width)/ Failure Mode | 13.7 ± 8.8 Adhesive | 57.8 ± 14.6 Adhesive | 4.3 ± 0.2 Adhesive | 14.5 ± 8.0 Adhesive | 20.9 ± 7.4 Cohesive | 22.3 ± 7.8 Adhesive | 0.9 ± 0.1 Mixed | 8.7 ± 3.7 Adhesive |

*Adhesive Formulations S2-A2, B2, C2 and D2 contain the oil-displacing agent 1,8-cineole. The remaining formulations do not contain an oil-displacing agent.

The EPON 828 mixture was removed from the heat and allowed to cool to room temperature. 8 grams of SYLOTHIX 53® were added to the mixture, and stirred for 5 minutes. In all stages of the process, the solution was continuously Lap shear specimens (Method 1) were prepared from steel panels oiled with 3 g/m$^2$ Zeller-Gmelin KTL N 16 oil, with glass beads being lightly sprinkled over one set of the lap shear joints as a spacer (coverage less than 1% of bondline surface). Adhesives S2-A1, A2, B1 and B2 were cured for 18 hours at room temperature followed by 30 minutes at 180° C. in a heat press. Adhesives S2-C1, C2, D1 and D2 were cured for 18 hours at room temperature. The results of the lap shear measurements are shown in Table 3.

T-peel specimens (Method 3) were prepared from steel panels oiled with 3 g/m² Zeller-Gmelin KTL N 16 oil using 10 mL wire spacers in the bondline. Adhesives S2-A1, A2, B1 and B2 were cured for 18 hours at room temperature followed by 30 minutes at 180° C. in a heat press. Adhesives S2-C1, C2, D1 and D2 were cured for 18 hours at room temperature. The results of the T-peel measurements are shown in Table 3.

Example 3

2-Part Epoxy Adhesives with High Concentrations of Oil-Displacing Agent

Epoxy Formulations (Part 1).

Epoxy formulations were prepared as summarized in Table 4 and described in further detail below.

TABLE 4

| Ingredients* | E3-A (g) | E3-B (g) | E3-C (g) | E3-D (g) |
|---|---|---|---|---|
| EPON 828 | 100 | 100 | 100 | 100 |
| α-Pinene Oxide | 26.5 | | | |
| Limonene Oxide | | 26.5 | | |
| 1,8-cineole | | | 26.5 | |
| EPODIL 757 | | | | 26.5 |
| PARALOID EXL 2600 | 15 | 15 | 15 | 15 |
| K-FLEX XMB-301 | 13.1 | 13.1 | 13.1 | 13.1 |
| Tripropylene Glycol Monomethyl Ether | 1 | 1 | 1 | 1 |
| Polyethyleneglycol Sorbitol | 1 | 1 | 1 | 1 |
| Glass Beads | 1 | 1 | 1 | 1 |
| AEROSIL VP-R-2935 | 2 | 2 | 2 | 2 |

*Epoxy Formulations E3-A, B, and C contain oil-displacing agents α-pinene oxide, limonene oxide and 1,8-cineole, respectively. Epoxy Formulation E3-D does not contain an oil-displacing agent; EPODIL 757 is a reactive diluent.

In a 600 mL glass beaker, 100 grams of EPON 828 were mixed with 26.5 grams of oil displacing agent (or diluent in the case of E3-D) at room temperature using a propeller mixer. 15 grams of PARALOID EXL 2600 were slowly added and mixed into the EPON 828 mixture over the course of 15 minutes. The EPON 828 mixture was subsequently heated to 80° C. and maintained at that temperature for 90 minutes. The EPON 828 mixture was removed from the heat and allowed to cool to room temperature, and the remaining ingredients in the formulation were added. In all stages of the process, the solution was continuously stirred. After all ingredients were added, the EPON 828 mixture was degassed and stored in a closed container at room temperature until use.

Amine Formulation A1 (Part 2).

Amine Formulation A1 was prepared as described in Example 2.

Adhesives.

The quantities of amine formulation (Part 2) and epoxy formulation (Part 1) used to make each adhesive are summarized in Table 5. Each adhesive was made by mixing Amine Formulation A1, the respective epoxy formulation, and 0.3 grams of glass beads in a metal cup until homogeneous.

TABLE 5

| Adhesive* | S3-A (g) | S3-B (g) | S3-C (g) | S3-D (g) |
|---|---|---|---|---|
| Amine Formulation A1 | 6.0 | 6.0 | 6.0 | 6.0 |
| Epoxy Formulation E3-A | 11.9 | | | |
| Epoxy Formulation E3-B | | 11.9 | | |
| Epoxy Formulation E3-C | | | 11.9 | |
| Epoxy Formulation E3-D | | | | 9.4 |

*Adhesive Formulations S3-A, B, and C contain oil-displacing agents α-pinene oxide, limonene oxide and 1,8-cineole, respectively. Adhesive Formulation S3-D does not contain an oil-displacing agent.

The lap shear performance and T-peel performance of each adhesive were determined under the following conditions.

1.a.

Lap shear specimens (Method 1) and T-peel specimens (Method 2) were prepared from etched aluminum. The adhesive bonds were cured for 18 hours at room temperature followed by 30 minutes at 180° C. in a heat press at 2000 psi. Results are summarized in Table 6. All adhesives exhibited cohesive mode failure during both lap shear strength testing and T-peel strength testing.

TABLE 6

| Adhesive | Lap Shear Strength (psi) | T-Peel Strength (lb$_f$/in-width) |
|---|---|---|
| S3-A | 3884.6 ± 135.3 | 48.0 ± 4.6 |
| S3-B | 1794.7 ± 81.3 | 39.8 ± 0.2 |
| S3-C | 3231.6 ± 275.0 | 54.6 ± 12.7 |

1.b.

Lap shear specimens (Method 1) and T-peel specimens (Method 1) were prepared from steel panels oiled with 3 g/m² of OEST B804/3 COW-1 oil. The adhesive bonds were cured for 18 hours at room temperature followed by 30 minutes at 180° C. in a heat press at 2000 psi. Results are summarized in Table 7.

TABLE 7

| Adhesive | Lap Shear Strength (psi) | T-Peel Strength (lb$_f$/in-width) |
|---|---|---|
| S3-A | 651.1 ± 149.8 | 29.0 ± 6.5 |
| S3-B | 107.5 ± 25.6 | 6.7 ± 0.3 |
| S3-C | 1688.3 ± 215.0 | 39.4 ± 4.4 |
| S3-D | 68.8 ± 9.0 | 7.0 ± 0.4 |

S3-A, B and C contained an oil displacing agent. S3-D did not contain an oil displacing agent; however, the weight ratio of the curable epoxy group to curative amino group is also somewhat lower than that of the other examples. During lap shear strength testing, adhesives S3-A, B and C each exhibited apparent mixed mode failure, whereas adhesive S3-D exhibited apparent adhesive failure. During T-peel strength testing, all adhesives exhibited apparent adhesive failure.

1.c.

Lap shear specimens (Method 1) and T-peel specimens (Method 1) were prepared from steel panels oiled with 3 g/m² of OEST B804/3 COW-1 oil. The adhesive bonds were cured at room temperature for a minimum of 72 hours. Results are summarized in Table 8. All adhesives exhibited apparent adhesive failure during lap shear strength testing and T-peel strength testing.

TABLE 8

| Adhesive | Lap Shear Strength (psi) | T-Peel Strength (lb/in-width) |
|---|---|---|
| S3-A | 1239.9 ± 91.3 | 23.4 ± 7.6 |
| S3-B | 247.2 ± 38.8 | 15.0 ± 1.5 |
| S3-C | 1725.2 ± 83.7 | 10.2 ± 0.0 |
| S3-D* | 455.9 ± 73.6 | 17.0 ± 1.4 |

*Only four lap shear test specimens were generated for this composition.

Example 4

2-Part Epoxy Adhesives Comprising Various Oil-Displacing Agents

Epoxy Formulations (Part 1).

Epoxy formulations were prepared as summarized in Table 9 and described in further detail below.

TABLE 9

| Ingredients | E4-A (g) | E4-B (g) | E4-C (g) | E4-D (g) | E4-E (g) | E4-F (g) | E4-G (g) | E4-H (g) |
|---|---|---|---|---|---|---|---|---|
| EPON 828 | 85 | 85 | 85 | 85 | 85 | 85 | 85 | 85 |
| EPONEX 1510 | 15 | 15 | 15 | 15 | 15 | 15 | 15 | 15 |
| Methyl Glycidyl Ether | 5 | | | | | | | |
| Ethyl Glycidyl Ether | | 5 | | | | | | |
| Isopropyl Glycidyl Ether | | | 5 | | | | | |
| n-Butyl Glycidyl Ether | | | | 5 | | | | |
| Isobutyl Glycidyl Ether | | | | | 5 | | | |
| Tert-Butyl Glycidyl Ether | | | | | | 5 | | |
| EPODIL 746 | | | | | | | 5 | |
| EPODIL 747 | | | | | | | | 5 |
| PARALOID EXL 2691 | 15 | 15 | 15 | 15 | 15 | 15 | 15 | 15 |
| K-FLEX XMB-301 | 13.1 | 13.1 | 13.1 | 13.1 | 13.1 | 13.1 | 13.1 | 13.1 |
| CAB-O-SIL TS-720 | 2 | 2 | 2 | 2 | 2 | 2 | 2 | 2 |

In a 600 mL glass beaker, 85 grams of EPON 828 and 15 grams of EPONEX 1510 were mixed with 5 grams of the respective diluent at room temperature using a propeller mixer. 15 grams of PARALOID EXL 2691 were slowly added and mixed into the EPON 828 mixture over the course of 15 minutes. The EPON 828 mixture was subsequently heated to 80° C. and maintained at that temperature for 90 minutes. The EPON 828 mixture was removed from the heat and allowed to cool to room temperature, and the remaining ingredients in the formulation were added. In all stages of the process, the solution was continuously stirred. After all ingredients were added, the resultant mixture was degassed and stored in a closed container at room temperature until use.

Amine Formulation A1 (Part 2).

Amine Formulation A1 was prepared as described in Example 2.

Adhesives.

The quantities of amine formulation (Part 2) and epoxy formulation (Part 1) used to make each adhesive are summarized in Table 10. Each adhesive was made by mixing Amine Formulation A1, the respective epoxy formulation, and 0.3 grams of glass beads in a metal cup until homogeneous.

TABLE 10

| Adhesive | Epoxy Formulation | Amine Formulation A1 | Lap Shear (psi) | T-Peel (lb/in-width) |
|---|---|---|---|---|
| S4-A | 24.89 g E4-A | 4.0 g | 4636 ± 369 | 29.1 ± 8.2 |
| S4-B | 25.20 g E4-B | 4.0 g | 4451 ± 665 | 30.8 ± 17.7 |
| S4-C | 25.43 g E4-C | 4.0 g | 4278 ± 319 | 52.0 ± 6.2 |
| S4-D | 25.62 g E4-D | 4.0 g | 5206 ± 327 | 21.9 ± 5.3 |
| S4-E | 25.62 g E4-E | 4.0 g | 4278 ± 319 | 38.7 ± 5.9 |
| S4-F | 25.62 g E4-F | 4.0 g | 5090 ± 333 | 48.7 ± 4.6 |
| S4-G | 26.27 g E4-G | 4.0 g | 4698 ± 227 | 42.6 ± 12.8 |
| S4-H | 26.31 g E4-H | 4.0 g | 4527 ± 653 | 31.8 ± 0.4 |

Lap shear specimens (Method 1) and T-peel specimens (Method 1) were prepared from steel panels oiled with 3 g/m² of OEST B804/3 COW-1 oil. The adhesive bonds were cured at room temperature for 18 hours followed by 30 minutes at 180° C. in a heat press at 2000 psi. Results are summarized in Table 10. All adhesives exhibited apparent mixed mode failure during lap shear strength testing and T-peel strength testing.

Example 5

2-Part Epoxy Adhesives Comprising Fillers

Epoxy Formulations (Part 1).

Epoxy formulations were prepared as summarized in Table 11 and described in further detail below.

TABLE 11

| Ingredients* | E5-A1 (g) | E5-A2 (g) | E5-B (g) |
|---|---|---|---|
| EPON 828 | 85 | 85 | 85 |
| EPONEX 1510 | 15 | 15 | 15 |
| EPODIL 757 | 5 | | |
| 1,8-Cineole | | 5 | 5 |
| PARALOID EXL 2691 | 15 | 15 | 15 |
| K-FLEX XMB-301 | 13.1 | 13.1 | 13.1 |
| CAB-O-SIL TS720 | 2 | 2 | 8 |

*Epoxy Formulations E5-A2 and B contain the oil-displacing agent 1,8-cineole. Epoxy Formulation E5-A1 does not contain an oil-displacing agent; EPODIL 757 is a reactive diluent.

Preparation of Epoxy Formulation E5-A1.

In a one pint metal can, 85 grams of EPON 828 were mixed with 15 grams of EPONEX 1510 and 5 grams of EPODIL 757 at room temperature using a propeller mixer. 15 grams of PARALOID EXL 2691 were slowly added and mixed into the EPON 828 mixture over the course of 15 minutes. The EPON 828 mixture was subsequently heated to 80° C. and maintained at that temperature for 90 minutes. The EPON 828 mixture was removed from the heat and allowed to cool to room temperature. 13.1 grams of K-FLEX XMB-301 were slowly added to the mixture, and the mixture was stirred for one minute. 2 grams of CAB-O-SIL TS-720 were added to the EPON 828 mixture, and the mixture was stirred at 800 RPM until the silica was well dispersed in the mixture (approximately five minutes). In all stages of the process, the solution was continuously stirred. After all ingredients were added, the EPON 828 mixture was degassed and stored in a closed container at room temperature until use.

Preparation of Epoxy Formulation E5-A2.

In a one pint metal can, 85 grams of EPON 828 were mixed with 15 grams of EPONEX 1510 and 5 grams of 1,8-cineole at room temperature using a propeller mixer. 15 grams of PARALOID EXL 2691 were slowly added and mixed into the EPON 828 mixture over the course of 15 minutes. The EPON 828 mixture was subsequently heated to 80° C. and maintained at that temperature for 90 minutes. The EPON 828 mixture was removed from the heat and allowed to cool to room temperature. 13.1 grams of K-FLEX XMB-301 were slowly added to the mixture, and the mixture was stirred for one minute. 2 grams of CAB-O-SIL TS-720 were added to the EPON 828 mixture, and the mixture was stirred at 800 RPM until the silica was well dispersed in the mixture (approximately five minutes). In all stages of the process, the solution was continuously stirred. After all ingredients were added, the EPON 828 mixture was degassed and stored in a closed container at room temperature until use.

Preparation of Epoxy Formulation E5-B.

In a 600 mL glass beaker, 85 grams of EPON 828 and 15 g of EPONEX 1510 were mixed with 5 grams of 1,8-cineole at room temperature using a propeller mixer. 15 grams of PARALOID EXL 2600 were slowly added and mixed into the EPON 828 mixture over the course of 15 minutes. The EPON 828 mixture was subsequently heated to 80° C. and maintained at that temperature for 90 minutes. The EPON 828 mixture was removed from the heat and allowed to cool to room temperature, and the remaining ingredients in the formulation were added. In all stages of the process, the solution was continuously stirred. After all ingredients were added, the EPON 828 mixture was degassed and stored in a closed container at room temperature until use.

Amine Formulation A1 (Part 2).

Amine Formulation A1 was prepared as described in Example 2.

Adhesive.

The quantities of amine formulation (Part 2) and epoxy formulation (Part 1) used to make each adhesive are summarized in Table 12. Each adhesive was made by mixing Amine Formulation A1 with the respective epoxy formulation in a metal cup until homogeneous.

TABLE 12

| Adhesive | S5-A1* (g) | S5-A2* (g) | S5-B** (g) |
|---|---|---|---|
| Amine Formulation A1 | 3 | 3 | 3 |
| Epoxy Formulation E5-A1 | 19.47 | | |
| Epoxy Formulation E5-A2 | | 20.46 | |
| Epoxy Formulation E5-B | | | 20.46 |
| Lap Shear (psi) | 2962 ± 1335 | 3562 ± 498 | |
| T-Peel (lb/in-width) | 20.9 ± 11.6 | 42.5 ± 15.8 | 27.7 ± 14.7 |

*Only four T-peel test specimens were generated for this composition.
**No lap shear measurements were made.

Lap shear specimens (Method 2) and T-peel specimens (Method 3) were prepared from steel panels oiled with 3 g/m² of MULTIDRAW® KTL N16 oil. The adhesive bonds were cured for 18 hours at room temperature followed by 30 minutes at 180° C. in a heat press at approximately 20 psi. Results are summarized in Table 12.

Adhesives S5-A1 and A2 exhibited apparent mixed mode failure during lap shear strength testing and T-peel strength testing. Adhesive S5-B exhibited apparent mixed mode failure during T-peel strength testing.

Example 6

2-Part Epoxy Adhesives with Inorganic Mineral Fibers or Fillers Having Aspherical Platelet Structures Epoxy Formulations (Part 1).

Epoxy formulations were prepared as summarized in Table 13 and described in further detail below.

TABLE 13

| Ingredients | E6-A1 (g) | E6-A2 (g) | E6-B (g) | E6-C (g) | E6-D (g) |
|---|---|---|---|---|---|
| EPON 828 | 85 | 85 | 85 | 85 | 85 |
| EPONEX 1510 | 15 | 15 | 15 | 15 | 15 |
| EPODIL 757 | 5 | | | | |
| 1,8-Cineole | | 5 | 5 | 5 | 5 |
| PARALOID EXL 2691 | 15 | 15 | 15 | 15 | 15 |
| K-FLEX XMB-301 | 13.1 | 13.1 | 13.1 | 13.1 | 13.1 |
| COATFORCE ® CF50 | 8 | 8 | | | |
| HUBER 70C | | | 8 | | |
| HUBER 2000C | | | | 8 | |
| Wollastonite | | | | | 8 |

Preparation of Epoxy Formulation E6-A1.

In a one pint metal can, 85 grams of EPON 828 were mixed with 15 grams of EPONEX 1510 and 5 grams of EPODIL 757 at room temperature using a propeller mixer. 15 grams of PARALOID EXL 2691 were slowly added and mixed into the EPON 828 mixture over the course of 15 minutes. The EPON 828 mixture was subsequently heated to 80° C. and maintained at that temperature for 90 minutes. The EPON 828 mixture was removed from the heat and allowed to cool to room temperature. 13.1 grams of K-FLEX XMB-301 were slowly added to the mixture, and the mixture was stirred for one minute. 8 grams of Lapinus COATFORCE® CF50 fibers were added to the EPON 828 mixture, and the mixture was stirred at 800 RPM until the fibers were well dispersed in the mixture (approximately five minutes). In all stages of the process, the solution was continuously stirred. After all ingredients were added, the EPON 828 mixture was degassed and stored in a closed container at room temperature until use.

Preparation of Epoxy Formulation E6-A2.

In a one pint metal can, 85 grams of EPON 828 were mixed with 15 grams of EPONEX 1510 and 5 grams of 1,8-cineole at room temperature using a propeller mixer. 15 grams of PARALOID EXL 2691 were slowly added and mixed into the EPON 828 mixture over the course of 15 minutes. The EPON 828 mixture was subsequently heated to 80° C. and maintained at that temperature for 90 minutes. The EPON 828 mixture was removed from the heat and allowed to cool to room temperature. 13.1 grams of K-FLEX XMB-301 were slowly added to the mixture, and the mixture was stirred for one minute. 8 grams of Lapinus COATFORCE® CF50 fibers were added to the EPON 828 mixture, and the mixture was stirred at 800 RPM until the fibers were well dispersed in the mixture (approximately five minutes). In all stages of the process, the solution was continuously stirred. After all ingredients were added, the EPON 828 mixture was degassed and stored in a closed container at room temperature until use.

Preparation of Epoxy Formulations E6-B, C and D.

In a 600 mL glass beaker, 85 grams of EPON 828 and 15 g of EPONEX 1510 were mixed with 5 grams of 1,8-cineole at room temperature using a propeller mixer. 15 grams of PARALOID EXL 2600 were slowly added and mixed into the EPON 828 mixture over the course of 15 minutes. The EPON 828 mixture was subsequently heated to 80° C. and maintained at that temperature for 90 minutes. The EPON 828 mixture was removed from the heat and allowed to cool to room temperature, and the remaining ingredients in the formulation were added. In all stages of the process, the solution was continuously stirred. After all ingredients were added, the EPON 828 mixture was degassed and stored in a closed container at room temperature until use.

Amine Formulation A1 (Part 2).

Amine Formulation A1 was prepared as described in Example 2.

Adhesives.

The quantities of amine formulation (Part 2) and epoxy formulation (Part 1) used to make each adhesive are summarized in Table 14. Each adhesive was made by mixing Amine Formulation A1 and the respective epoxy formulation in a metal cup until homogenous.

TABLE 14

| Adhesive | S6-A1 (g) | S6-A2* (g) | S6-B** (g) | S6-C** (g) | S6-D** (g) |
|---|---|---|---|---|---|
| Amine Formulation A1 | 3 | 3 | 3.0 | 3.0 | 3.0 |
| Epoxy Formulation E6-A1 | 20.33 | | | | |
| Epoxy Formulation E6-A2 | | 21.37 | | | |
| Epoxy Formulation E6-B | | | 21.4 | | |
| Epoxy Formulation E6-C | | | | 21.4 | |
| Epoxy Formulation E6-D | | | | | 21.4 |
| Lap Shear (psi) | 4079 ± 1283 | 4593 ± 558 | | | |
| T-Peel (lb/in-width) | 48.1 ± 7.9 | 91.4 ± 13.6 | 55.7 ± 30.0 | 72.0 ± 5.6 | 79.7 ± 14.4 |

*Only four T-peel test specimens were generated for this composition.
**No lap shear measurements were made.

Lap shear specimens (Method 2) and T-peel specimens (Method 3) were prepared from steel panels oiled with 3 g/m² of MULTIDRAW® KTL N16 oil. The adhesive bonds were cured at room temperature for 18 hours followed by 30 minutes at 180° C. in a heat press at approximately 20 psi. Results are summarized in Table 12. During lap shear testing, S6-A1 exhibited apparent mixed mode failure and S6-A2 exhibited cohesive failure. During T-peel testing, S6-A1 and B exhibited mixed mode failure and S-A2, C and D exhibited cohesive failure.

Example 7

2-Part Epoxy Adhesive with Filler/Fiber Combination

Epoxy Formulation (Part 1).

The epoxy formulation was prepared as summarized in Table 15 and described in further detail below.

TABLE 15

| Ingredients | E7 (g) |
|---|---|
| EPON 828 | 85 |
| EPONEX 1510 | 15 |
| 1,8-Cineole | 5 |
| PARALOID EXL 2691 | 15 |
| K-FLEX XMB-301 | 13.1 |
| (3-Glycidyloxypropyl)trimethoxysilane | 3.8 |
| COATFORCE ® CF50 | 8 |
| SHIELDEX AC5 | 8 |

In a one pint metal can, 85 grams of EPON 828 were mixed with 15 grams of EPONEX 1510 and 5 grams of 1,8-cineole at room temperature using a propeller mixer. 15 grams of PARALOID EXL 2691 were slowly added and mixed into the EPON 828 mixture over the course of 15 minutes. The EPON 828 mixture was subsequently heated to 80° C. and maintained at that temperature for 90 minutes. The Epon 828 mixture was removed from the heat and allowed to cool to room temperature. 13.1 grams of K-FLEX XMB-301 were slowly added to the mixture, and the mixture was stirred for one minute. 3.8 grams of (3-Glycidyloxypropyl)trimethoxysilane were slowly added to the mixture, and the mixture was stirred for one minute. 8 grams of Lapinus COATFORCE® CF50 fibers were added to the EPON 828 mixture, and the mixture was stirred at 800 RPM until the fibers were well dispersed in the mixture (approximately five minutes). 8 grams of SHIELDEX AC5 were slowly added to the mixture, and the mixture was stirred for one minute. In all stages of the process, the solution was continuously stirred. After all ingredients were added, the EPON 828 mixture was degassed and stored in a closed container at room temperature until use.

Amine Formulation A1 (Part 2).

Amine Formulation A1 was prepared as described in Example 2.

Amine Formulation A2 (Part 2).

In a one pint metal can, 117 grams of TTD were mixed with 74.5 grams of EPONEX 1510 and heated to 80° C. for one hour. Subsequently, 9.8 grams of calcium nitrate were added to the solution, and mixed for one hour at 80° C. Then 25.4 grams of ANCAMINE K54 were added to the solution, and mixed for six hours at 80° C. The resultant solution was allowed to cool to room temperature, degassed and stored in a closed container at room temperature until use.

Adhesive (Induction Cure).

The quantities of amine formulation (Part 2) and epoxy formulation (Part 1) used to make the adhesive are summarized in Table 16. The adhesive was made by mixing Amine Formulation A1, the respective epoxy formulation, and 0.3 grams of glass beads in a metal cup until homogeneous.

TABLE 16

| Adhesive | S7-A (g) |
|---|---|
| Amine Formulation A1 | 3.0 |
| Epoxy Formulation E7 | 15.4 |
| Glass Beads | 0.3 |
| Lap Shear Strength (psi) | 296.8 ± 113.4 |
| Failure Mode | Mixed Mode |

Lap shear specimens were prepared from 4"×1"×0.063" steel panels oiled with 3 g/m² of MULTIDRAW® KTL N16 oil. A strip of approximately ½" wide and 0.010" thick adhesive was applied to one edge of each of two panels (i.e., adherends) using a scraper. The adhesive bonds were immediately clamped together using a 1" binder clip and induction cured in a Miller Induction Heating System (available from Miller Electric Manufacturing Co. in Appleton, Wis., USA). The system included a model IHPS5 10-5 Induction Heating power system, a model IHCA 25-50 induction heating controller, and a Radiator 1A cooling system. The sample was placed in the induction heating unit and heated for 10 seconds with the induction heating coil to achieve a bondline temperature of about 120° C. for 40 seconds. Upon reaching room temperature, the samples were immediately tested to failure at room temperature on a Sintech Tensile Testing machine using a crosshead displacement rate of 0.1"/min. The failure load was recorded. The lap width was measured with a vernier caliper. The quoted lap shear strengths were calculated as failure load/(measured width of the bond×measured length of the bond). The average and standard deviation were calculated from the results of at least five tests unless otherwise noted. The samples exhibited a lap shear strength of 296.8±113.4 psi with apparent mixed mode failure.

Adhesive (Room Temperature Cure).

The quantities of amine formulation (Part 2) and epoxy formulation (Part 1) used to make each adhesive are summarized in Table 17. The adhesive was made by mixing Amine Formulation A2, the respective epoxy formulation, and 0.3 grams glass beads in a metal cup until homogenous.

TABLE 17

| Adhesive | S7-B (g) |
|---|---|
| Amine Formulation A2 | 4.0 |
| Epoxy Formulation E7 | 16.2 |
| Glass Beads | 0.3 |
| Lap Shear Strength (psi) | 2095 ± 329 |
| Failure Mode | Mixed Mode |

Lap shear specimens (Method 1) were prepared from steel panels oiled with 3 g/m² of MULTIDRAW® KTL N16 oil. The adhesive bonds were cured at room temperature for 3 hours. The samples exhibited a lap shear strength of 2095±329 psi with apparent mixed mode failure.

Example 8

2-Part Epoxy Adhesives with SYLOTHIX

Epoxy Formulations (Part 1).

Epoxy formulations were prepared as summarized in Table 18 and described in further detail below.

TABLE 18

| Ingredients | E8-A (g) | E8-B (g) |
|---|---|---|
| EPON 828 | 85 | 85 |
| EPONEX 1510 | 15 | 15 |
| EPODIL 757 | 5 | |
| 1,8-Cineole | | 5 |
| PARALOID EXL 2691 | 15 | 15 |
| K-FLEX XMB-301 | 13.1 | 13.1 |
| SYLOTHIX 52 ® | 8 | |
| SYLOTHIX 53 ® | | 8 |

Preparation of Epoxy Formulation E8-A.

In a one pint metal can, 85 grams of EPON 828 were mixed with 15 grams of EPONEX 1510 and 5 grams of EPODIL 757 at room temperature using a propeller mixer. 15 grams of PARALOID EXL 2691 were slowly added and mixed into the EPON 828 mixture over the course of 15 minutes. The EPON 828 mixture was subsequently heated to 80° C. and maintained at that temperature for 90 minutes. The EPON 828 mixture was removed from the heat and allowed to cool to room temperature. 13.1 grams of K-FLEX XMB-301 were slowly added to the mixture, and the mixture was stirred for one minute. 8 grams of SYLOTHIX 52 fibers were added to the EPON 828 mixture, and the mixture was stirred at 800 RPM until the fibers were well dispersed in the mixture (approximately five minutes). In all stages of the process, the solution was continuously stirred. After all ingredients were added, the EPON 828 mixture was degassed and stored in a closed container at room temperature until use.

Preparation of Epoxy Formulation E8-B.

In a one pint metal can, 85 grams of EPON 828 were mixed with 15 grams of EPONEX 1510 and 5 grams of 1,8-cineole at room temperature using a propeller mixer. 15 grams of PARALOID EXL 2691 were slowly added and mixed into the EPON 828 mixture over the course of 15 minutes. The EPON 828 mixture was subsequently heated to 80° C. and maintained at that temperature for 90 minutes. The EPON 828 mixture was removed from the heat and allowed to cool to room temperature. 13.1 grams of K-FLEX XMB-301 were slowly added to the mixture, and the mixture was stirred for one minute. 8 grams of SYLOTHIX 53® fibers were added to the EPON 828 mixture, and the mixture was stirred at 800 RPM until the fibers were well dispersed in the mixture (approximately five minutes). In all stages of the process, the solution was continuously stirred. After all ingredients were added, the EPON 828 mixture was degassed and stored in a closed container at room temperature until use.

Amine Formulation A1 (Part 2).

Amine Formulation A1 was prepared as described in Example 2.

Adhesives (R.T. Cure+Post Cure).

The quantities of amine formulation (Part 2) and epoxy formulation (Part 1) used to make each adhesive are summarized in Table 19. Each adhesive was made by mixing Amine Formulation A1 and the respective epoxy formulation in a metal cup until homogenous.

TABLE 19

| Adhesive | S8-A1 (g) | S8-B1 (g) |
|---|---|---|
| Amine Formulation A1 | 1.5 | 1.5 |
| Epoxy Formulation E8-A | 10.7 | |
| Epoxy Formulation E8-B | | 10.7 |
| Lap Shear Strength (psi) | 4256.9 ± 239.3 | 4387.9 ± 157.6 |
| T-Peel Strength (lb$_f$/in-width) | 52.2 ± 1.7 | 46.6 ± 11.1 |

Lap shear specimens (Method 1) and T-peel specimens (Method 3) were prepared from steel panels oiled with 3 g/m² of MULTIDRAW® KTL N16 oil. The adhesive bonds were cured for 18 hours at room temperature followed by 30 minutes at 180° C. in a heat press at approximately 20 psi. The results of the adhesive bond strength tests are shown in Table 19. Both adhesives exhibited cohesive failure during lap shear and T-peel strength testing.

Adhesives (R. T. Cure).

The quantities of amine formulation (Part 2) and epoxy formulation (Part 1) used to make each adhesive are summarized in Table 20. Each adhesive was made by mixing Amine Formulation A1 and the respective epoxy formulation in a metal cup until homogenous.

TABLE 20

| Adhesive | S8-A2 (g) | S8-B2 (g) |
|---|---|---|
| Amine Formulation A1 | 3.0 | 3.0 |
| Epoxy Formulation E8-A | 10.7 | |
| Epoxy Formulation E8-B | | 10.7 |
| Lap Shear Strength (psi) | 4116.4 ± 215.0 | 4031.5 ± 97.0 |
| T-Peel Strength (lb$_f$/in-width) | 35.9 ± 2.8 | 38.3 ± 4.1 |

Lap shear specimens (Method 1) and T-peel specimens (Method 3) were prepared from steel panels oiled with 3 g/m² of MULTIDRAW® KTL N16 oil. The adhesive bonds were cured at room temperature for a minimum of 24 hours. The results of the adhesive bond strength tests are shown in Table 20. Both adhesives exhibited cohesive failure during lap shear and T-peel strength testing.

Example 9

Two-Part Epoxy Adhesive with Various Fillers

Epoxy Formulations (Part 1).

Epoxy formulations were prepared as summarized in Table 21 and described in further detail below.

TABLE 21

| Ingredients | E9-A (g) | E9-B (g) | E9-C (g) | E9-D (g) | E9-E (g) |
|---|---|---|---|---|---|
| EPON 828 | 80 | 80 | 80 | 80 | 80 |
| EPONEX 1510 | 20 | 20 | 20 | 20 | 20 |
| Isodecyl benzoate | 7.5 | 7.5 | 7.5 | 7.5 | 7.5 |
| PARALOID EXL 2691 | 15 | 15 | 15 | 15 | 15 |
| SILANE Z-6040 | 3.8 | 3.8 | 3.8 | 3.8 | 3.8 |
| SHORT STUFF ® ESS5F | 8 | | | | |
| SHORT STUFF ® ESS50F | | 8 | | | |
| INHANCE ® PEF | | | 8 | | |
| SHORT STUFF ® ESS2F | | | | 8 | |
| INHANCE ® KF | | | | | 8 |

Preparation of Epoxy Formulations E9-A Through E.

In a one pint metal can, 80 grams of EPON 828 were mixed with 20 grams of EPONEX 1510 and 7.5 grams of isodecyl benzoate at room temperature using a propeller mixer. 15 grams of PARALOID EXL 2691 were slowly added and mixed into the EPON 828 mixture over the course of 15 minutes. The EPON 828 mixture was subsequently heated to 80° C. and maintained at that temperature for 90 minutes. The EPON 828 mixture was removed from the heat and allowed to cool to room temperature. 3.8 grams of SILANE Z-6040 were slowly added to the mixture, and the mixture was stirred for one minute. 8 grams of fiber were added to the EPON 828 mixture, and the mixture was stirred at 800 RPM until the fibers were well dispersed in the mixture (approximately five minutes). In all stages of the process, the solution was continuously stirred. After all ingredients were added, the EPON 828 mixture was degassed and stored in a closed container at room temperature until use.

Amine Formulation A1 (Part 2).

Amine Formulation A1 was prepared as described in Example 2.

Preparation of Adhesives S9-A Through E.

The quantities of amine formulation (Part 2) and epoxy formulation (Part 1) used to make each adhesive are summarized in Table 22. Each adhesive was made by mixing Amine Formulation A1 and the respective epoxy formulation in a metal cup until homogenous.

TABLE 22

| Adhesive | S9-A (g) | S9-B (g) | S9-C (g) | S9-D (g) | S9-E (g) |
|---|---|---|---|---|---|
| Amine Formulation A1 | 8 | 8 | 8 | 8 | 8 |
| Epoxy Formulation E9-A | 30.76 | | | | |
| Epoxy Formulation E9-B | | 30.76 | | | |
| Epoxy Formulation E9-C | | | 30.76 | | |
| Epoxy Formulation E9-D | | | | 30.76 | |
| Epoxy Formulation E9-E | | | | | 30.76 |

The adhesives were cured under various conditions and their lap shear strength and/or T-peel strength measured.

All lap shear strength measurements are made according to Method 1. The glass beads were added in the amount of 1% w/w into the curing adhesive prior to making the bond. At least three bonds were made for each testing condition. The reported lap shear strengths and standard deviations are the average of at least three test measurements.

All T-peel strength measurements were made according to Method 3, except that measurements were taken on the larger specimen (i.e., specimens were not cut into 1" wide samples). The T-peel strength and standard deviations are the average of at least three test measurements.

1.a.

T-peel specimens were prepared from clean cold-rolled steel panels. The adhesive bonds were cured at room temperature for a minimum of 24 hours. Results are summarized in Table 23.

TABLE 23

| Adhesive | T-Peel (lb$_f$/in-width) | Failure Mode |
|---|---|---|
| S9-A | 31.3 ± 3.3 | Cohesive |
| S9-B | 31.8 ± 4.4 | Cohesive |
| S9-C | 36.2 ± 1.7 | Cohesive |
| S9-D | 21.8 ± 1.6 | Cohesive |
| S9-E | 25.4 ± 1.4 | Adhesive |

1.b.

Lap Shear specimens and T-peel specimens were prepared from steel panels oiled with 3 g/m² of MULTIDRAW® KTL N16. The adhesive bonds were cured at room temperature for a minimum of 24 hours. Results are summarized in Table 24.

TABLE 24

| Adhesive | Lap Shear Strength (psi) | Failure Mode | T-Peal (lb/in-width) | Failure Mode* |
|---|---|---|---|---|
| S9-A | 4002 ± 528 | Cohesive | 27.0 ± 10.2 | TCF/MM |
| S9-B | 4726 ± 288 | Cohesive | 26.4 ± 2.2 | TCF/MM |
| S9-C | 4420 ± 383 | Cohesive | 38.7 ± 7.7 | TCF/MM |
| S9-D | | | 15.2 ± 1.8 | TCF/MM |
| S9-E | | | 24.1 ± 3.6 | Adhesive |

*TCF—thin cohesive failure; MM—mixed mode failure 1.c.

Lap shear specimens were prepared from steel panels oiled with 3 g/m² of MULTIDRAW® KTL N16. The adhesive bonds were cured at room temperature for a minimum of 24 hours, cured for 45 minutes at 177° C., and then cooled to room temperature until tested. The adhesive bonds were tested at 80° C. Results are summarized in Table 25.

TABLE 25

| Adhesive | Lap Shear Strength (psi) | Failure Mode* |
|---|---|---|
| S9-A | 342 ± 16 | Cohesive/MM |
| S9-B | 351 ± 90 | Cohesive/MM |
| S9-C | 714 ± 192 | MM |

*MM—mixed mode failure

Example 10

Two-Part Epoxy Adhesive with Nanocalcite

Epoxy Formulations (Part 1).

Epoxy formulations were prepared as summarized in Table 26 and described in further detail below.

TABLE 26

| Ingredients | E10-A (g) | E10-B (g) |
|---|---|---|
| EPON 828 | 27.2 | 80 |
| EPONEX 1510 | 20 | 20 |
| Isodecyl benzoate | 7.5 | 7.5 |
| PARALOID EXL 2600 | 15 | 15 |
| SILANE Z-6040 | 3.8 | 3.8 |
| NPCC-201/EPON 828 Masterbatch | 63.16 | |

Preparation of NPCC-201/EPON 828 Masterbatch.

The NPCC-201 was dispersed in toluene at 25% solids using a Silverson model L4R high shear mixer. It was mixed for 10 minutes resulting in a smooth mixture. The toluene dispersion was then added to EPON 828 and the toluene removed in a rotary evaporator. The resultant masterbatch was 20% by weight nanocalcite in EPON 828.

Preparation of Epoxy Formulation E10-A.

In a one pint metal can, 27.2 grams of EPON 828 were mixed with, 63.16 grams of NPCC-201/EPON 828 Masterbatch, 20 grams of EPONEX 1510 and 7.5 grams of isodecyl benzoate at room temperature using a propeller mixer. 15 grams of PARALOID EXL 2600 was slowly added and mixed into the EPON 828 mixture over the course of 15 minutes. The EPON 828 mixture was subsequently heated to 80° C. and maintained at that temperature for 90 minutes. The EPON 828 mixture was removed from heat and allowed to cool to room temperature. 3.8 grams of SILANE Z-6040 were slowly added to the mixture, and the mixture was stirred for one minute. In all stages of the process, the solution was continuously stirred. After all ingredients were added, the EPON 828 mixture was degassed and stored in a closed container at room temperature until use.

Preparation of Epoxy Formulation E10-B.

In a one pint metal can, 80 grams of EPON 828 were mixed with 20 grams of EPONEX 1510 and 7.5 grams of isodecyl benzoate at room temperature using a propeller mixer. 15 grams of PARALOID EXL 2600 was slowly added and mixed into the EPON 828 mixture over the course of 15 minutes. The EPON 828 mixture was subsequently heated to 80° C. and maintained at that temperature for 90 minutes. The EPON 828 mixture was removed from heat and allowed to cool to room temperature. 3.8 grams of SILANE Z-6040 were slowly added to the mixture, and the mixture was stirred for one minute. In all stages of the process, the solution was continuously stirred. After all ingredients were added, the EPON 828 mixture was degassed and stored in a closed container at room temperature until use.

Amine Formulation A3 (Part 2).

In a one pint metal can, 117 grams of TTD were mixed with 28.5 grams of ANCAMINE K54 at room temperature using propeller mixer. The mixture was stirred until homogenized, and then it was degassed and stored in a closed container at room temperature until use.

Adhesive Formulations S10-A1 Through 4.

The quantities of amine formulation (Part 2) and epoxy formulation (Part 1) used to make each adhesive are summarized in Table 27. Each adhesive was made by mixing Amine Formulation A3 with Epoxy Formulation E10-A in a metal cup until homogenous.

TABLE 27

| Adhesive | S10-A1 (g) | S10-A2 (g) | S10-A3 (g) | S10-A4 (g) |
|---|---|---|---|---|
| Amine Formulation A3 | 10 | 10 | 10 | 10 |
| Epoxy Formulation E10-A | 78.3 | 78.3 | 78.3 | 78.3 |
| Oil | None | COW | KTL | CD 303 |
| T-Peel (lb/in-width) | 44.3 ± 12.5 | 31.3 ± 16.6 | 43.0 ± 8.7 | 19.0 ± 3.6 |
| Failure Mode | Cohesive | Cohesive | Cohesive | Mixed Mode |

T-peel strength measurements were made according to Method 3, except that measurements were taken on the larger specimen (i.e., specimens were not cut into 1" wide samples). T-peel specimens were prepared from clean cold-rolled steel panels, or from steel panels oiled with 3 g/m² of MULTIDRAW® KTL N16 (KTL), OEST B804/3 COW-1 (COW) or Cedar Draw 303PX2 Barium Free (CD 303). The adhesive bonds were cured at room temperature for a minimum of 24 hours, followed by 30 minutes at 180° C. T-peel strength and standard deviations are the average of at least three test measurements.

Adhesive Formulations S10-B1 Through 4.

The quantities of amine formulation (Part 2) and epoxy formulation (Part 1) used to make each adhesive are summarized in Table 28. Each adhesive was made by mixing Amine Formulation A3 with Epoxy Formulation E10-B in a metal cup until homogenous.

TABLE 28

| Adhesive | S10-B1 (g) | S10-B2 (g) | S10-B3 (g) | S10-B4 (g) |
|---|---|---|---|---|
| Amine Formulation A3 | 10 | 10 | 10 | 10 |

TABLE 28-continued

| Adhesive | S10-B1 (g) | S10-B2 (g) | S10-B3 (g) | S10-B4 (g) |
|---|---|---|---|---|
| Epoxy Formulation E10-B | 78.3 | 78.3 | 78.3 | 78.3 |
| Oil | None | COW | KTL | CD 303 |
| T-Peel (lb/in-width) | 30.7 ± 6.7 | 22.3 ± 2.3 | 31.3 ± 6.7 | 18.0 ± 8.7 |
| Failure Mode | Mixed Mode | Mixed Mode | Mixed Mode | Mixed Mode |

T-peel strength measurements were made according to Method 3, except that measurements were taken on the larger specimen (i.e., specimens were not cut into 1" wide samples). T-peel specimens were prepared from clean cold-rolled steel panels, or from steel panels oiled with 3 g/m² of MULTI-DRAW® KTL N16 (KTL), OEST B804/3 COW-1 (COW) or Cedar Draw 303PX2 Barium Free (CD 303). The adhesive bonds were cured at room temperature for a minimum of 24 hours, followed by 30 minutes at 180° C. T-peel strength and standard deviations are the average of at least three test measurements.

Example 11

2-Part Epoxy Adhesive

Preparation of Epoxy Adhesive. A DAC speed mixer cup was charged with 87.52 grams of KANEKA ACE MX125, 79.5 grams of EPON 828, 10 grams of K-FLEX XMB-301, 3 grams of SILANE Z-6040 and 20 grams of EPALLOY 5000. This epoxy mixture was mixed for approximately one minute at 2500 RPM in a FlackTek SpeedMixer DAC (Landrum, S.C.). Then, 100 grams of the epoxy mixture was placed in a DAC speed mixer cup, and 4 grams of 1,8-cineole and 6 grams of SYLOTHIX 53 were added to the mixture. This mixture was then mixed for approximately one minute at 2500 RPM in a FlackTek Speed Mixer DAC. The mixture was degassed under vacuum, and loaded into a 2:1 syringe on the larger volume side. The smaller volume side of the syringe was charged with the A-side curative from SCOTCH-WELD Epoxy Adhesive DP420 Black (Part A) (3M, St Paul, Minn.). When applied, the adhesive was dispensed from a 2:1 syringe cartridge using a 3M EPX dispenser and static mixer.

Preparation of Adhesive Specimens.

Overlap shear (Method 1) specimens were prepared from aluminum panels oiled with 3 g/m² Zeller-Gmelin KTL N 16 and glass beads in the bondline. T-peel specimens (Method 3) were prepared from steel panels oiled with 3 g/m² Zeller-Gmelin KTL N 16 oil using 10 mL wire spacers in the bondline. The adhesive was cured for 18 hours at room temperature. The overlap shear value (from three samples) was 4039±572 psi with cohesive failure. The T-peel value (from three samples) was 30.3±7.4 (lb/in-width) with apparent mixed mode failure.

Example 12

Synthesis of Reactive Liquid Modifiers

DEO-400.

The oxamido ester-terminated polypropylene oxide was prepared according to the below reaction scheme:

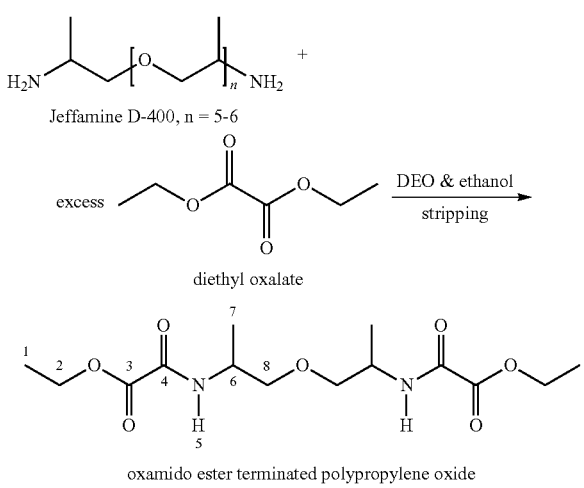

To a 2 L flask was added 730.70 grams sieve dried diethyloxalate and sufficient argon to purge the headspace. Using an addition funnel, 200.00 grams JEFFAMINE® D-400 were added to the flask over the course of 90 minutes with vigorous stirring. Using a set up for distillation-argon sparge (subsurface), the temperature of the contents in the flask was slowly increased to 150° C. in order to distill out excess diethyloxalate and ethanol. The resultant product was a wisky brown, clear liquid weighing 273.2 grams and having a viscosity of 3,400 cP.

MaAcAc 1000 MW Oligomer (AcAc1K).

20 grams MaAcAc, 4.75 grams IOTGA, 0.051 grams VAZO 67 and 30 grams ethyl acetate were charged to a 4 oz. glass polymerization bottle. The bottle was purged with nitrogen for five minutes, sealed, and placed in a water bath maintained at 60° C. for 24 hours. The reaction mixture was then removed from the bath, and the solvent was stripped under vacuum. Peak ratio of the tail fragment protons to the backbone protons in ¹H NMR (in CDCl₃) indicated approximately 4.65 repeat units per molecule, or an epoxide equivalent weight (EEW) of 270.

MaAcAc 2000 MW Oligomer (AcAc2K).

20 grams of MaAcAc, 2.32 grams IOTGA, 0.051 grams VAZO 67 and 30 grams ethyl acetate were charged to a 4 oz. glass polymerization bottle. The bottle was purged with nitrogen for five minutes, sealed, and placed in a water bath maintained at 60° C. for 24 hours. The reaction mixture was then removed from the bath, and the solvent was stripped under vacuum. Peak ratio of the tail fragment protons to the backbone protons in ¹H NMR (in CDCl₃) indicated approximately 9 repeat units per molecule, or an EEW of 243.

Urethane diAcAc #1 (AcAcUD).

35 grams t-butyl acetoacetate were added to 20 grams K-FLEX UD-320-100. The resultant mixture was heated to 120° C. and refluxed overnight using a vigoreaux condenser.

The reaction product was then distilled under vacuum to remove the excess t-butyl acetoacetate. $^1$H NMR (in CDCl$_3$) confirms essentially pure Urethane diAcAc #1.

Urethane diAcAc #2 (AcAcXM).

50 grams t-butyl acetoacetate were added to 20 grams K-FLEX XM-311. The resultant mixture was heated to 120° C. and refluxed overnight using a vigoreaux condenser. The reaction product was then distilled under vacuum to remove the excess t-butyl acetoacetate. $^1$H NMR (in CDCl$_3$) confirms essentially pure Urethane diAcAc #2.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

Thus, the invention provides, among other things, a two-part epoxy-based structural adhesive. Various features and advantages of the invention are set forth in the following claims.

What is claimed is:

1. A two-part adhesive composition having a first part and a second part, the adhesive composition comprising:
   a curable epoxy resin in the first part;
   an amine curing agent in the second part;
   a toughening agent in the first part, the second part, or combination thereof;
   an oil displacing agent in the first part, the second part, or combination thereof, wherein the solubility parameter of the oil displacing agent ranges from 7 to 10.5 cal$^{0.5}$/cm$^{3/2}$; and
   a filler in the first part, the second part, or combination thereof, wherein the filler comprises an inorganic mineral fiber comprising from about 37% to about 42% by weight SiO$_2$, from about 18% to about 23% by weight Al$_2$O$_3$, from about 34% to about 39% by weight CaO+MgO, from 0% to about 1% by weight FeO, and about 3% by weight K$_2$O+Na$_2$O;
   wherein an adhesive is formed when the first part and the second part are combined.

2. The composition of claim 1 wherein the curable epoxy resin comprises a diglycidylether of bisphenol A.

3. The composition of claim 1 wherein the toughening agent comprises a core/shell polymer, an acrylic polymer, a butadiene nitrile rubber or combinations thereof.

4. The composition of claim 1 wherein the toughening agent comprises a core/shell polymer having a core comprising a butadiene polymer, a butadiene copolymer, a styrene polymer, a styrene copolymer or a butadiene-styrene copolymer and a shell comprising a polyacrylate polymer or a polyacrylate copolymer.

5. The composition of claim 1 wherein the oil-displacing agent has a surface tension less than about 35 mN/m.

6. The composition of claim 1 wherein the oil-displacing agent comprises 1,8-cineole, α-pinene oxide, limonene oxide, C$_1$-C$_{10}$ glycidyl ethers or combinations thereof.

7. The composition of claim 1 wherein the curable epoxy resin has one or more epoxy moieties and the amine curing agent has one or more amine hydrogens and the molar ratio of epoxy moieties on the curable epoxy resin to amine hydrogens on the amine curing agent ranges from about 0.5:1 to about 3:1.

8. The composition of claim 1 further comprising a reactive liquid modifier in the first part, the second part or combination thereof.

9. The composition of claim 8 wherein the reactive liquid modifier comprises a tri-acetoacetate functional ester or an oxamido ester-terminated polypropylene oxide.

10. The composition of claim 1, wherein the filler in the first part, the second part, or combination thereof further comprises an organic fiber, a fiber having aspherical structural, a fiber having platelet structure, or combinations thereof.

11. The composition of claim 10 wherein the filler is a high-density polyethylene fiber.

12. The composition of claim 1, wherein the composition has a lap shear measurement of at least 2500 psi and a T-peel measurement of at least 20 lb$_f$/in-width after being cured for 18 hours at room temperature followed by 30 minutes at 180° C.

13. The composition of claim 1 further comprising a secondary curative in the first part, the second part or combination thereof.

14. A method of making a composite article, the method comprising:
    applying the two-part adhesive composition of claim 1 to a surface; and
    curing the two-part adhesive composition in contact with the surface to form a composite article.

15. The method of claim 14, wherein the surface is contaminated with hydrocarbon-containing material.

16. The method of claim 15, wherein the oil displacing agent exhibits a surface tension lower than that of the hydrocarbon-containing material, a solubility parameter similar to that of the hydrocarbon containing material, or a combination thereof.

17. A method of forming a bonded joint between members, the method comprising:
    applying the two-part adhesive composition of claim 1 to a surface of at least one of two or more members;
    joining the members so that the two-part adhesive composition is sandwiched between the two or more members; and
    curing the two-part adhesive composition to form a bonded joint between the two or more members.

18. The method of claim 17, wherein the surface of at least one of the two or more members is contaminated with hydrocarbon-containing material.

19. The method of claim 18, wherein the oil displacing agent exhibits a surface tension lower than that of the hydrocarbon-containing material, a solubility parameter similar to that of the hydrocarbon containing material, or a combination thereof.

* * * * *

UNITED STATES PATENT AND TRADEMARK OFFICE
CERTIFICATE OF CORRECTION

PATENT NO. : 8,618,204 B2
APPLICATION NO. : 13/055198
DATED : December 31, 2013
INVENTOR(S) : Christopher Campbell Page 1 of 2

It is certified that error appears in the above-identified patent and that said Letters Patent is hereby corrected as shown below:

Title Page 2, Col. 2 Item (56) (Other Publications)
Line 32, delete "Modififed" and insert -- Modified --

In the Specification

Column 3
Lines 59-60, delete "1-dinaphrhylmethane," and insert -- 1-diphenylmethane --

Column 10
Line 46, delete "pimleic acid," and insert -- pimelic acid --

Line 49, delete "hexadehydrophthalic" and insert -- hexahydrophthalic --

Line 60, delete "pentaerythriol," and insert -- Pentaerythritol, --

Column 11
Line 7, delete "acetacetylation" and insert -- acetoacetylation --

Column 13
Line 3, delete "USA)" and insert -- USA). --

Column 16
Line 58, delete "1,4-cyclohexandimethanoldiglycidylether" and insert
-- 1, 4-cyclohexanedimethanoldiglycidylether. --

Column 17
Line 30, delete "Hunstman" and insert -- Huntsman --

Signed and Sealed this
Seventeenth Day of June, 2014

Michelle K. Lee
*Deputy Director of the United States Patent and Trademark Office*

Column 18
Line 19, delete "sorbital." and insert -- sorbitol. --

Column 20
Line 59 (approx.), delete "Glutimate*'" and insert -- Glutamate* --